United States Patent
Schlanger

(10) Patent No.: US 7,357,460 B2
(45) Date of Patent: Apr. 15, 2008

(54) CONNECTING SYSTEM FOR TENSILE ELEMENTS

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 0 days.

(21) Appl. No.: 10/755,653

(22) Filed: Jan. 12, 2004

(65) Prior Publication Data
US 2004/0155518 A1 Aug. 12, 2004

Related U.S. Application Data

(60) Provisional application No. 60/439,819, filed on Jan. 13, 2003.

(51) Int. Cl.
*B60B 1/02* (2006.01)
(52) U.S. Cl. ............... 301/104; 301/55; 403/265; 403/267; 403/268
(58) Field of Classification Search ............ 301/55, 301/58, 59, 104, 61; 403/289, 290, 292, 403/361, 265, 267, 268, 269
See application file for complete search history.

(56) References Cited
U.S. PATENT DOCUMENTS

| | | | | |
|---|---|---|---|---|
| 7,719 A | * | 10/1850 | Badcock | 56/203 |
| 436,993 A | * | 9/1890 | Overman | 152/327 |
| 522,813 A | | 7/1894 | Welch | |
| 1,306,773 A | * | 6/1919 | Poeton | 403/361 |
| 1,909,344 A | * | 5/1933 | Green et al. | 403/284 |
| 1,934,102 A | * | 11/1933 | Stoler | 301/104 |
| 2,105,182 A | * | 1/1938 | Church | 403/361 |
| 2,621,385 A | * | 12/1952 | Gilmore | 403/284 |
| 3,552,787 A | * | 1/1971 | Yee | 403/265 |
| 3,698,749 A | * | 10/1972 | Yonkers | 403/197 |
| 4,692,052 A | * | 9/1987 | Yee | 403/13 |
| 4,729,605 A | * | 3/1988 | Imao et al. | 301/104 |
| 5,110,190 A | * | 5/1992 | Johnson | 301/55 |
| 5,350,221 A | * | 9/1994 | Pearce et al. | 301/104 |
| 5,613,334 A | * | 3/1997 | Petrina | 52/223.1 |
| 5,729,952 A | * | 3/1998 | Dahl | 52/740.7 |
| 5,779,323 A | | 7/1998 | Burrows | |
| 6,036,279 A | * | 3/2000 | Campagnolo | 301/55 |
| 6,036,281 A | * | 3/2000 | Campbell | 301/104 |
| 6,265,065 B1 | * | 7/2001 | McCallion | 428/375 |

(Continued)

FOREIGN PATENT DOCUMENTS

JP 2-299901 * 12/1990

OTHER PUBLICATIONS

Machinery's Handbook, 25th Edition, pp. 192, 193, Erik Oberg et al, 1996.*

(Continued)

*Primary Examiner*—Russell D. Stormer

(57) ABSTRACT

An improved connecting system for tensile elements, including a longitudinal tensile element having an end portion and a cross-section thereof, a deformable connecting element; a bracing element, and a tensile axis of applied tensile load along said longitudinal tensile element. The deformable connecting element surrounds the cross section of the longitudinal tensile element and the deformable connecting element is joined to the longitudinal tensile element by means of plastic deformation of said deformable connecting element. The deformable connecting element is connected to the bracing element.

49 Claims, 15 Drawing Sheets

U.S. PATENT DOCUMENTS

| | | | |
|---|---|---|---|
| 6,282,859 B1 * | 9/2001 | Van Der Heijden | 85/585.1 |
| 6,520,595 B1 * | 2/2003 | Schlanger | 301/59 |
| 6,679,024 B2 * | 1/2004 | Dahl | 52/726.1 |
| 2003/0006643 A1 * | 1/2003 | Chen | 301/104 |
| 2004/0124694 A1 * | 7/2004 | Tien | 301/58 |

OTHER PUBLICATIONS

Materials Science in Engineering, Third Edition, pp. 49 and 50, Carl A. Keyser, 1980.*

Marbri Engineering & Supply Company webpage; Emaco S88 CI fiber-reinforced grout; 2005.*

* cited by examiner

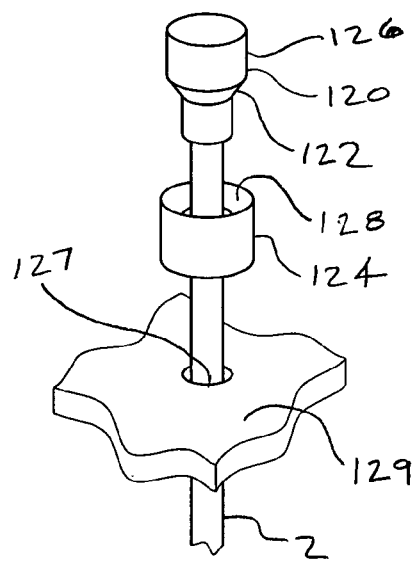
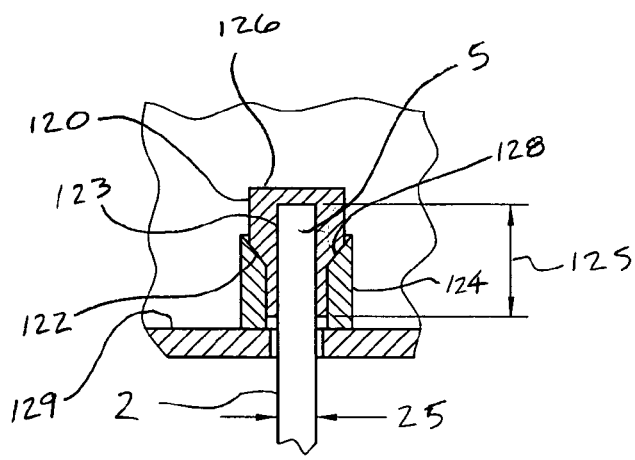
FIG. 12a    FIG. 12b
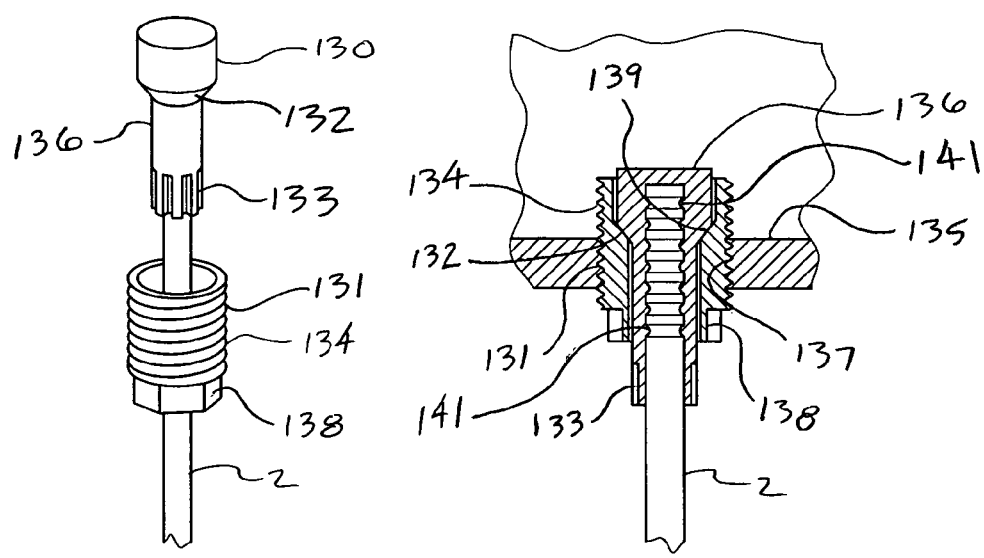
FIG. 13a    FIG. 13b

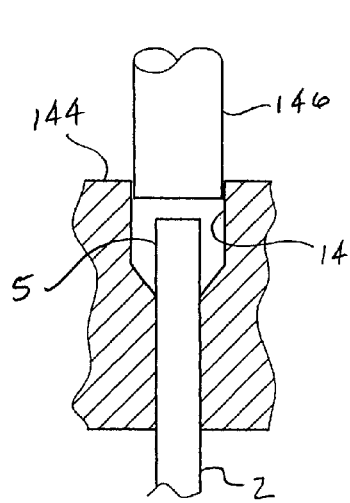
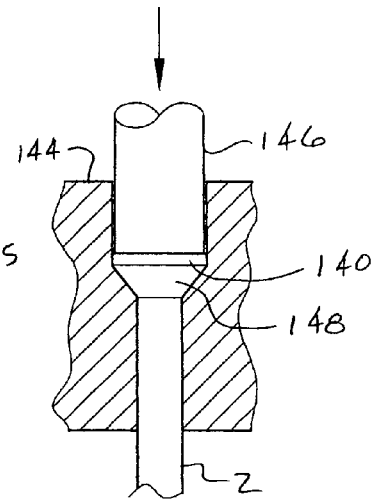
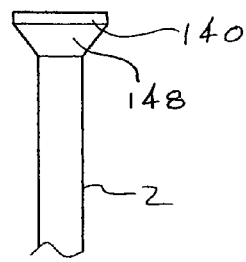
FIG. 20a    FIG. 20b    FIG. 20c
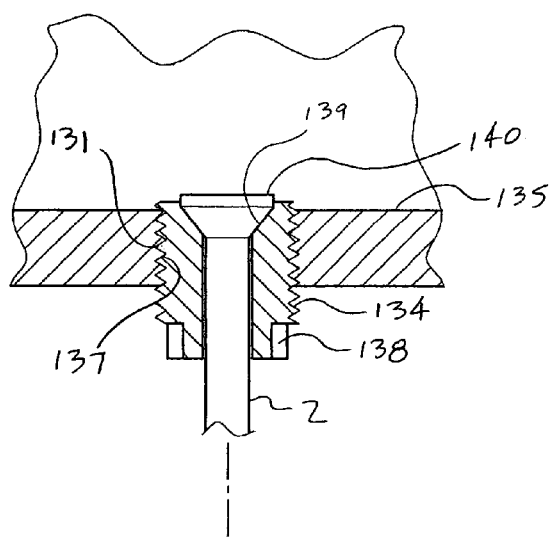
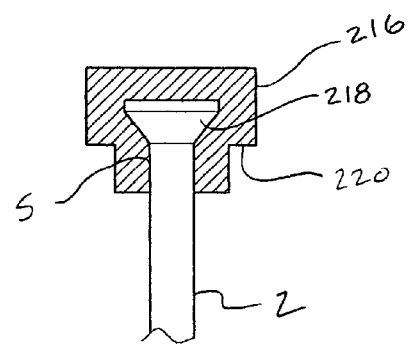
FIG. 20d    FIG. 21

CONNECTING SYSTEM FOR TENSILE ELEMENTS

CROSS-REFERENCE TO RELATED APPLICATION

This application claims priority of U.S. provisional patent application 60/439,819, filed Jan. 13, 2003, and entitled "Connecting System for Tensile Elements".

BACKGROUND OF THE INVENTION (1) Field of the Invention

The present invention relates to an improved connection system for a tensile element, particularly applicable to the spoke of a bicycle wheel.

(2) Description of the Related Art

Heretofore, the vast majority of bicycle wheels have been constructed using steel wire spokes with one headed end for connection with the bicycle hub and one end that is directly threaded to accept a spoke nipple that engages the rim. By adjusting the threaded connection between the spoke and the nipple, the overall length of the spoke may be shortened or lengthened to create a balanced pretension in the spokes of the wheel.

Bicycle spokes serve as structural tensile elements where the tension of the spoke is resisted by the compression of the outer rim hoop to create a remarkably efficient wheel structure for handling the loads associated with the operation of the bicycle. The technology of conventional bicycle spokes has remained unchanged for the better part of a century.

Cyclists are continually striving to reduce the weight and increase the efficiency of their bicycle, especially rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In attempt to reduce weight, many makers of high-end wheels are forming their spokes from thinner gage steel wire. This causes the stress in the spoke to increase and makes the wheel more prone to spoke failure due to fatigue. The thinner steel wire has lower tensile stiffness, which can contribute to a reduced lateral stiffness of the wheel.

In the last 20 years, great strides have been made in the development of very lightweight materials that also have excellent tensile characteristics. Some of the most attractive of these materials include high-performance fibers, such as carbon fiber, aramid fiber, liquid crystal fiber, PBO fiber and the like. However, these fibrous materials are far more difficult to efficiently couple or terminate than their steel-wire counterparts when attempting to utilize them as spokes in bicycle wheel construction. This is the primary reason that the vast majority of bicycle wheels are still constructed using steel spokes.

Accordingly, it is an objective of the present invention to overcome the forgoing disadvantages and to provide a coupling or termination connection for a tensile element that is strong, lightweight and inexpensive.

An efficient connector coupling or termination should have a tensile strength that approximates the tensile strength of the lightweight tensile element and should not be so heavy as to detract from the weight benefit of these lightweight materials. In addition, cost is always a concern in the bicycle industry. These lightweight materials are often more expensive than the steel wire that they replace. An overly complex or expensive connector would make such a spoke to be cost prohibitive.

It is a further objective of the present invention to provide a construction as aforesaid which reduces cost and provides a wheel that is light in weight and high in strength and reliability.

Further objects and advantages of the present invention will appear hereinbelow.

SUMMARY OF THE INVENTION

In accordance with the present invention, it has now been found that the forgoing objects and advantages may be readily obtained.

The present invention comprises a longitudinal tensile element having an end portion and a cross-section thereof, a deformable connecting element, a bracing element, and a tensile axis of applied tensile load along the longitudinal tensile element. The deformable connecting element surrounds the cross section of the longitudinal tensile element and is joined to the longitudinal tensile element by means of plastic deformation of the deformable connecting element. The deformable connecting element is connected to the bracing element.

In a preferred embodiment, the deformable connecting element serves as a coupling element to join a second tensile element to the longitudinal tensile element. In a further preferred embodiment the longitudinal tensile element overlaps the second tensile element along the tensile axis in an overlap region.

In an advantageous embodiment, the longitudinal tensile element includes reinforcement fibers. In a further advantageous embodiment, the reinforcement fibers are aligned to be parallel to the tensile axis. In a still further advantageous embodiment, the reinforcement fibers are encapsulated in a matrix. In a yet further embodiment, the matrix is at least one of a thermoplastic and a thermoset polymer resin matrix.

In an advantageous embodiment, the deformable connecting element comprises hardened molding material with reinforcement fibers, where the hardened molding material is formed in a mold.

In an additional advantageous embodiment, the deformable connecting element is embossed by a configured surface of the longitudinal tensile element or the longitudinal tensile element is embossed by a configured surface of the deformable connecting element to create mechanical interlock between the deformable connecting element and the longitudinal tensile element. In a further advantageous embodiment, the deformable connecting element is adhered to or welded to the longitudinal tensile element.

In an additional advantageous embodiment, an auxiliary element is provided to facilitate the connection between the deformable connecting element and the bracing element. In a further advantageous embodiment, the deformable connecting element has an overlie engagement with the bracing element, including matched surface-to-surface contact between the deformable connecting element and the bracing element and/or the auxiliary element.

In an additional advantageous embodiment, the deformable connecting element includes non-circular external geometry for rotational manipulation of the deformable connecting element.

The present invention obtains many advantages. One advantage of the present invention is the ability to utilize lightweight materials for the tensile element while minimizing the cost and expense of the completed assembly.

The embodiments described herein represent a range of configurations wherein a deformable material is utilized to create an effective coupling or termination of a tensile element such as a bicycle spoke. The result is an improved assembly, including a means to connect the spoke with a bracing component, such as a hub or rim, to create a bicycle wheel that is exceptionally durable and light in weight.

The present invention may be readily adapted to lightweight fibrous materials including high-performance fibers, such as carbon fiber, aramid fiber (such as Kevlar®), LCP (liquid crystal fiber such as Vectran®), PBO (polyphenylenebenzobisoxasole fiber such as Zylon®), polyethylene fiber (such as Spectra®) and the like. These materials may be of the dry-fiber form or they may be impregnated within a matrix. In any case, these materials represent a significant performance improvement over the steel spokes they replace. In comparison with the steel wire commonly used in spoke construction, these fibrous materials have equivalent or greater tensile strength than the steel spoke at a much lower density. This allows for the construction of a much lighter spoke and a lighter wheel. Further, these materials have significantly better vibration-damping characteristics for greater rider comfort and control. Still further, these materials also have excellent tensile fatigue properties to reduce or even eliminate spoke failures due to fatigue.

While the present invention may be readily adapted to tensile elements of fibrous or fiber-reinforced construction, the embodiments described herein may be readily adapted to other isotropic materials as well. The present invention provides localized reinforcement of the tensile element in the region of the coupling or termination. This reinforcement may be advantageous to provide support to the tensile element(s) in applications where the tensile element may, for example, be more brittle, more flexible, weaker or more notch-sensitive. Further, the present invention provides effective coupling or termination of a tensile element that would otherwise be difficult or impossible to achieve.

The present invention may be utilized to provide support and/or reinforcement to the junction between two tensile elements, permitting tensile loads to be transmitted effectively between the two tensile elements. The coupling and termination embodiments described herein are highly effective at transmitting tensile loads to the tensile element and can be made to be as strong or stronger than the tensile element that they are connected to. Further, the embodiments described herein are relatively simple and inexpensive to produce to effectively control the overall cost of the wheel.

In the discussions herein, a coupling involves two or more generally collinear tensile elements to provide the structural connection between the two tensile elements and permitting tensile loads to be transmitted from one tensile element to another. A termination usually involves only a single tensile element (i.e. spoke), where the termination provides a means to connect directly or indirectly to a bracing element (i.e. the hub or rim), to which the tensile element is intended to be anchored.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1b is a cross-section view of the bicycle wheel of FIG. 1a as seen generally in the direction 11-11 of FIG. 1a;

FIG. 2b is a cross-sectional view, taken along the tensile axis, and showing the connector assembly of FIG. 2a;

FIG. 3b is a cross-sectional view, taken along the tensile axis, and showing the connector assembly of FIG. 3a;

FIG. 4b is a cross-sectional view, taken along the tensile axis, and showing the connector assembly of FIG. 4a;

FIG. 7b is a cross-sectional view, taken along the tensile axis, and showing the connector assembly of FIG. 7a;

FIG. 8b is a cross-sectional view, taken along the tensile axis, and showing the connector assembly of FIG. 8a;

FIG. 9b is a cross-sectional view, taken along the tensile axis, and showing the connector assembly of FIG. 9a;

FIG. 10b is a cross-sectional view, taken along the tensile axis, and showing the connector assembly of FIG. 10a;

FIG. 11b is a cross-sectional view, taken along the tensile axis, and showing the connector assembly of FIG. 11a;

FIG. 12a is a partial perspective view of another embodiment of the present invention, in exploded assembly, including a ferrule, including an overmolded connector;

FIG. 12b is a cross-sectional view, taken along the tensile axis, and showing the connector assembly of FIG. 12a;

FIG. 13a is a partial perspective view of another embodiment of the present invention, in exploded assembly, including a threaded collar;

FIG. 13b is a cross-sectional view, taken along the tensile axis, and showing the connector assembly of FIG. 13a;

FIGS. 20a-c is are cross-sectional views, taken along the tensile axis, of an additional embodiment of the present invention, and showing a sequence of operations involved in forming an enlarged head onto the end of a spoke;

FIG. 20d is a cross-sectional view, taken along the tensile axis, and showing a connector assembly based on the enlarged head of FIG. 20c, including a threaded collar; and FIG. 21 is a cross-sectional view, taken along the tensile axis, and showing a connector assembly based on the enlarged head of FIG. 20c, including an overmolded collar;

DETAILED DESCRIPTION OF THE INVENTION

Figure 1A:
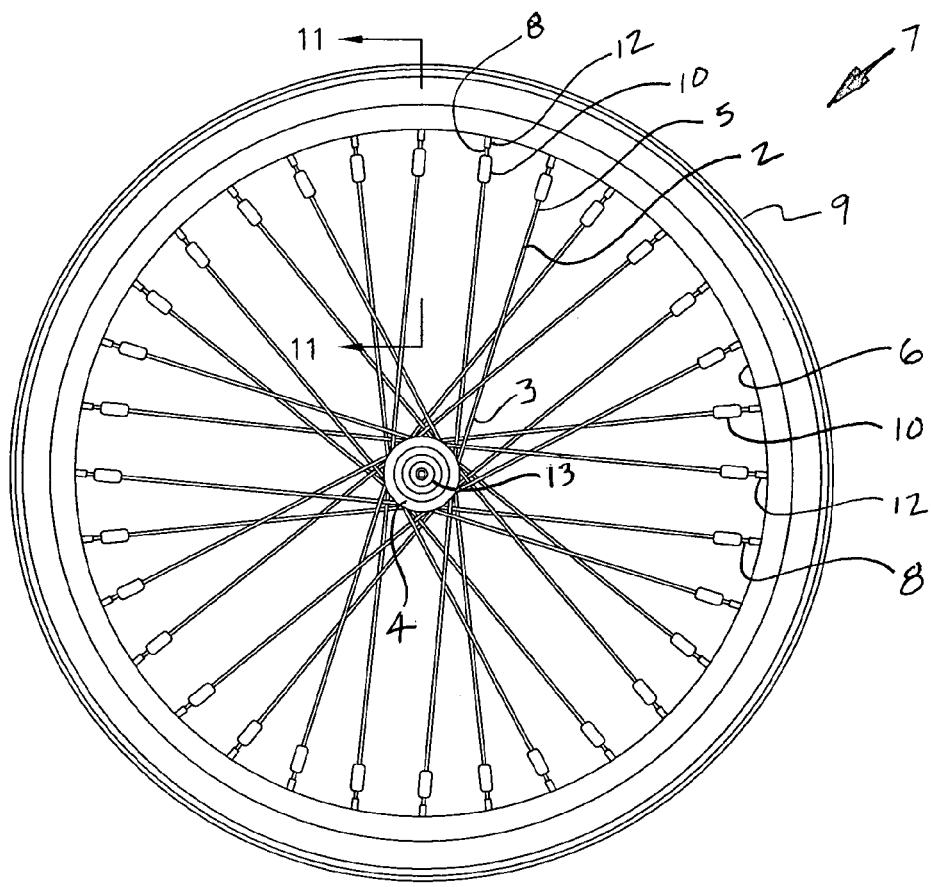
FIG. 1a is a plan view of a bicycle wheel, including connector collars as described in the present invention.

FIG. 1a shows a bicycle wheel 7 constructed with fiber reinforced spokes. The fiber reinforced spokes 2 are connected at their first end 3 to the hub 4. Hub 4 includes a central axle 13. To create a solid connection between the spoke 2 and the rim 6, the second end 5 of the fiber reinforced spoke 2 is first connected to a threaded fastener 8 by means of a coupling collar 10. The threaded fastener 8 is threadably mated to a spoke nipple 12 to connect with the rim 6 in the conventional manner. The tire 9 is mounted to the rim 6 in the conventional manner. It may be seen here that coupling collar 10 and fastener 8 are additional elements that serve to provide an effective connection for the second end 5 of the fiber reinforced spoke. FIG. 1a shows that all of the spokes of the wheel 7 may be terminated at the rim 6 in this manner. The coupling collar 10 and the fastener 8 may alternatively be connected to the first end 3 of the spoke 2 for connection to the hub 4. In such a case, the fastener may be connected to the hub via spoke nipples 12 or it may be directly threaded into mating holes of the hub 4 flange. Such an arrangement where the spoke is threadably connected directly to the hub flange is well known in industry. For simplicity in describing the present invention, only rim 6 connection arrangements are shown herein, with the understanding that these embodiments may be easily adapted to hub connections as well.

For purposes of convention in describing a wheel, the axial direction is a direction along the central axis of the axle 13. The radial direction is a direction perpendicular to the axial direction. The tangential direction is a direction perpendicular to the radial direction at a given radius to extend circumferentially about the wheel.

Figure 1B:
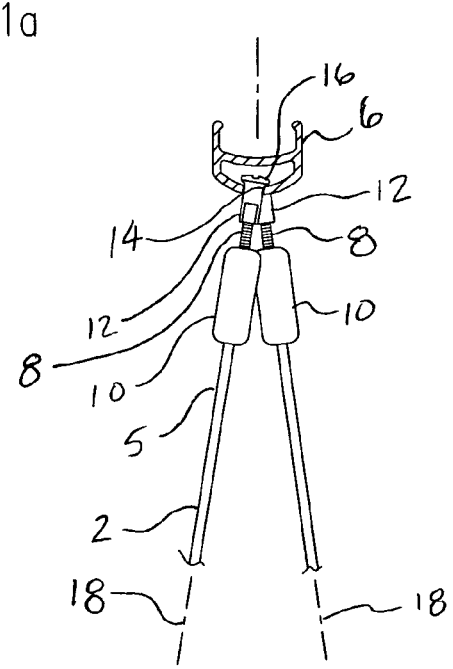

FIG. 1b is a detail of the embodiment described in FIG. 1a and shows the rim 6 in cross-section. The spoke nipple 12 is fitted through hole 14 in the rim 6 and is retained in place by the head portion 16 of the nipple 12. The nipple 12 is of conventional configuration and includes a female threaded central bore that is mated to the male threaded fastener 8. Thus, spoke pretension may be adjusted for each individual spoke by threadably tightening the nipple 12 on the fastener 8, effectively shortening the spoke 2 to induce tension to the spoke 2. Note that the span of spoke 2 is aligned in the direction of spoke tension, including a tensile axis 18 that is aligned in the direction of spoke tension and extends through the center of the spoke 2.

Figure 2A:
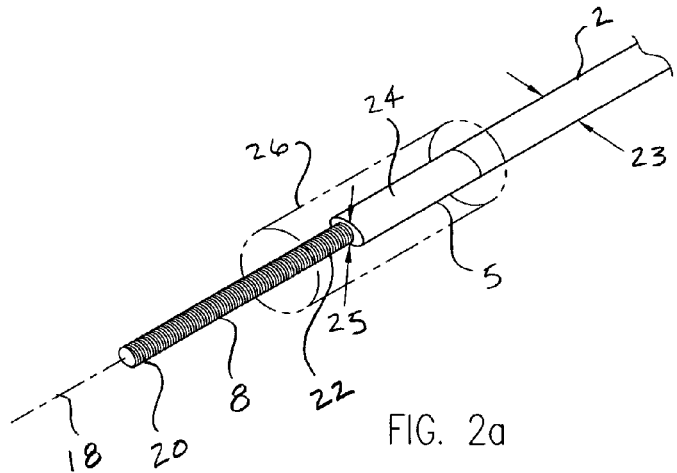
FIG. 2a is a partial perspective view of an embodiment of the present invention with the coupling collar in phantom, including an encapsulated straight portion of the spoke.

FIG. 2a describes one embodiment of the assembly between the tensile element or spoke 2, the fastener 8, and the coupling collar 26. As shown here, both the fastener 8 and the spoke 2 are aligned to be collinear with the tensile axis 18. Fastener 8 includes a first end 20 and a second end 22. The second end 5 of spoke 2 includes a straight portion 24 that is aligned with the tensile axis 18. The second end 22 of fastener 8 is aligned end-to-end with the straight portion 24 of the spoke 2. Coupling collar 26 surrounds the second end 22 of the fastener 8 and extends to surround the straight portion 24 of the spoke 2 as well. Coupling collar 26 is produced in an over-molding process where both the spoke 2 and fastener 8 are placed in a mold as inserts, with the second end 22 on the fastener 8 and the straight portion 24 of spoke 2 overhanging into the mold cavity. Molten resin is then introduced into the mold cavity to simultaneously surround and encapsulate both the second end 22 of the fastener 8 and the straight portion 24 of spoke 2. When the molten resin cools and solidifies, the coupling collar 26 is removed from the mold with the fastener 8 and the spoke 2 locked therein. An effective connection between the spoke 2 and the fastener 8 is thus achieved. Such a molding or casting arrangement is well known in industry and is commonly referred to as 'overmolding" or "insert molding'.

Figure 2B:
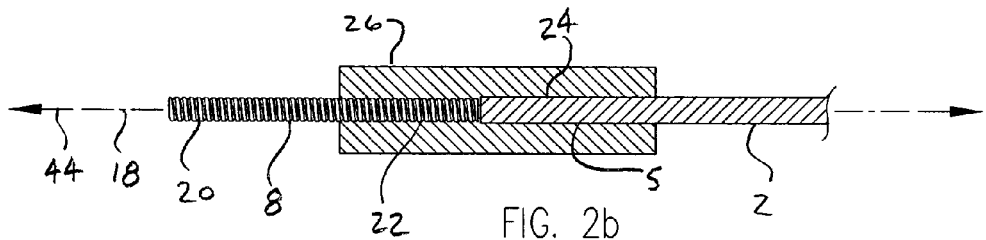

FIG. 2b shows the embodiment of FIG. 2a in cross-section. It may be seen that the fastener 8 is essentially an externally threaded rod that has a second end 22 that is encapsulated by the coupling collar 26 and a first end 20 that is exposed for subsequent fastening to the spoke nipple 12 of FIGS. 1a-b. Likewise, the straight end 24 of spoke 2 is encapsulated by the coupling collar 26. Tensile load 44 due to spoke tension is shown as applied to the fastener 8 and the spoke 2. The cross-section of spoke 2 is shown to be of a noncircular "aero" profile with a cross sectional width 23 greater than its thickness 25. Advantages of such an "aero" or aerodynamic profile are well known in industry.

The spoke 2 described herein may be produced from a wide range of materials. The preferred material is continuous-strand fiber-reinforced composite rod, where continuous filaments are generally aligned with the tensile axis 18. These continuous fibers may extend the full length of the spoke 2 and may be encapsulated in a matrix resin. Such rods may be produced by a pultrusion process that is well known in industry. Most commonly, these fibers are generally straight and parallel, however the fibers may alternatively be of twisted, braided or knitted construction. As a further alternative, the spoke 2 material may be produced with shorter discontinuous fibers in a matrix resin, where the discontinuous fibers are chopped fibers or milled fibers that intermingled and are preferably oriented generally along the tensile axis 18 of the spoke 2. The resin matrix used in this composite spoke may be a thermoplastic polymer resin or a thermoset resin. Examples of these resins are well known in industry. In a yet further alternative, the continuous fibers may be "dry fibers" where the fibers are not encapsulated in a matrix resin, but are instead simply bundled together, producing a more flexible and "rope-like" spoke. An outer sheath to protect the filaments may also be utilized to jacket these dry fibers. The fibers discussed herein are preferably selected from the family of high-performance fibers, including glass, aramid, carbon, LCP and PBO, among others. Alternatively, metallic fibers or cables may be utilized. Yet further, the spoke or tensile element may be constructed of solid rod such as stainless steel or titanium or some other isotropic material.

The fastener 8, which may also be viewed as simply a tensile element, is shown to be a threaded rod of metallic material, which is the preferred design. The coupling collar 26 is conformed to the externally threaded surface of the fastener 8, creating an interlocked overlie engagement that serves join the fastener 8 to the coupling collar 26 to resist pullout due to tensile loads. It is contemplated that a variety of alternative configured surface arrangements may be substituted for the threaded surface of the fastener to achieve a similar interlock engagement. A configured surface may be considered as an uneven surface created by variable cross-section geometry. Alternatively, this tensile element may be of any shape, material or length as contemplated for the spoke. Further, the fastener may include non-circular geometry within its encapsulated region to prevent rotational slippage about the tensile axis 18 between the fastener and the coupling collar.

It is preferred that the over-molded coupling collar 26 be injection molded with a fiber-reinforced thermoplastic or thermoset polymer resin. The fiber reinforcement supplies significant additional strength to the coupling collar. It is also preferable that these reinforcement fibers extend along the tensile axis 18 to span across the joint between the second end 5 of spoke 2 and the second end 22 of fastener 8. Thus, it is preferable that these reinforcement fibers be characterized as "long fibers" that are greater than 1.0 millimeters and preferably greater than 4.0 millimeters in length. These "long fibers" may extend to overlap and span across the juncture between the second end 5 of the spoke 2 and the second end 22 of the fastener 8 to further reinforce this joint. Injection molding is a relatively economical molding process that is readily applicable to a wide range of resin and fiber types. Also, depending on the mold design, the fiber orientation may be more or less highly oriented to optimize the properties of the coupling collar 26 material. However, it should be noted that many other materials and forming processes may be substituted. For example, a metallic coupling collar 26 material may be cast in place.

As shown in FIGS. 2a-b, the fastener 8 is not directly connected to the spoke 2 and tensile loads are transmitted from the spoke 2 to the coupling collar 26 and from the coupling collar 26 to the fastener 8. The coupling collar 26 serves as a connecting element to connect the second end 5 of the spoke 2 to the second end 22 of the fastener 8. This means that the material and geometry selected for the coupling collar 26 must be of sufficient strength to withstand the tensile loads 44 experienced by the spoke 2. This also means that the connection between the coupling collar 26 and both the spoke 2 and fastener 8 must exhibit sufficient strength to withstand these tensile loads 44. This connection may be achieved through at least one of the following modes of connection: mechanical interlock, friction, adhesion, and welding. To create mechanical interlock, the coupling collar has a configured surface to mate with a configured surface of the spoke and/or the fastener to provide a overlying interlocked geometry between the two. To create friction, a normal force is required at the interface between the coupling collar 26 and the spoke and/or the fastener. As an example, such a normal force may be provided by shrinkage of the coupling collar 26 upon cooling to grip the fastener 8 and/or the spoke 2. Adhesion involves a chemical bond at the interface between the two mating components and is a function of the chemistry of these materials. An adhesive or an adhesion-promoting agent may be utilized at this interface to increase adhesion. To achieve a welded connection, the coupling collar and the spoke 2 and/or fastener 8 should both be softened simultaneously so that the material on the surfaces of these components may be fused together. This may be achieved through the direct application of thermal and/or mechanical energy at the joint. For example, the overmolded coupling collar 26 may melt the second end 5 of spoke 2 somewhat during molding to allow the spoke 2 and the coupling collar to fuse together. Alternatively, an ultrasonically excited horn may be used to apply mechanical energy to the connection to effect welding in a manner well known in industry.

Although the encapsulated straight portion 24 of spoke 2 is shown to have a smooth surface, the surface may alternatively be indented or otherwise deformed to provide a degree of mechanical interlock between the straight portion of the spoke 24 and the overmolded coupling collar 26. It may be seen that the overmolding resin of the coupling collar 26 conforms to the threaded fastener 8 to achieve an interlocked connection therebetween.

It should be understood that plastic deformation involves the yielded deformation of a material due to pressure or load. This is in contrast to elastic deformation, in which the material springs back to its original shape when the applied pressure or load is removed. It may be considered that a molded material exhibits plastic deformation during molding, since the material is deformed to the shape of the mold cavity.

Figure 3A:
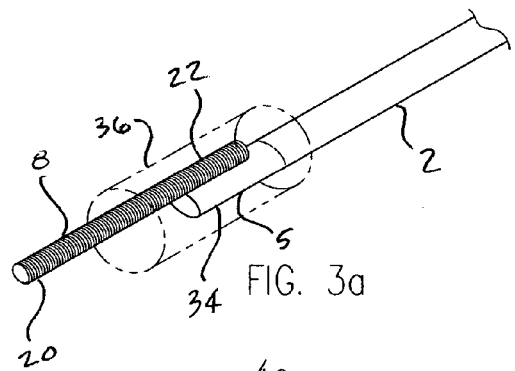
FIG. 3a is a partial perspective view of another embodiment of the present invention with the coupling collar in phantom, including offset overlap of two tensile elements.
Figure 3B:
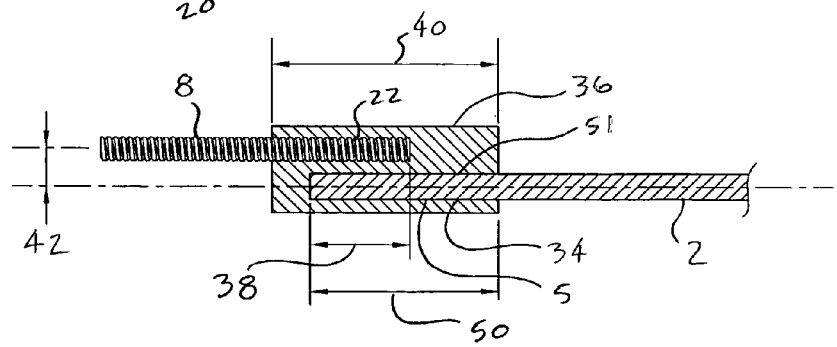

FIGS. 3a-b show the fastener 8 overlapping the spoke 2 within the coupling collar 36. In comparison with the coupling collar 26 of FIGS. 2a-b, which undergoes pure tensile loading at the butt joint between the spoke 2 and the fastener 8, the overlapping arrangement described in FIGS. 3a-b serves to rely on a certain degree of shear loading in the coupling collar 36 between spoke 2 and fastener 8. It may be seen in FIG. 3a that the straight portion 34 of spoke 2 overlaps 38 the fastener 8 along the tensile axis 18. This overlap 38 provides certain advantages over the embodiment of FIGS. 2a-b: Firstly, the overmolded coupling collar 36 now experiences a combined shear and tensile stress due to tensile loads 44. Secondly, the overall length 40 of the coupling collar 36 may be shorter, while still maintaining the required depth 50 of the engaged region 51 between the coupling collar and the straight end 34 of the spoke 2 and between the coupling collar 36 and the second end 22 of the fastener. Further, increasing the depth of overlap 38 will serve to strengthen the connection between the fastener 8 and the spoke 2 by increasing the shear area in the coupling collar 26 material between the two components and potentially reducing the tensile stress in the coupling collar 36.

By increasing the depth 50 of the engaged region 51, the surface area of contact between the spoke 2 and the coupling collar 36 is increased, resulting in a stronger connection between the two components to withstand spoke tensile loads. It is generally desirable to have an engagement region 51 with a depth 50 that is at least 4 times the average cross sectional thickness 25 of the spoke 2 in the engagement region 51. Likewise, increasing the depth of engagement between the coupling collar 36 and the fastener 8 will serve to increase the connection between the two components.

Figure 3C:
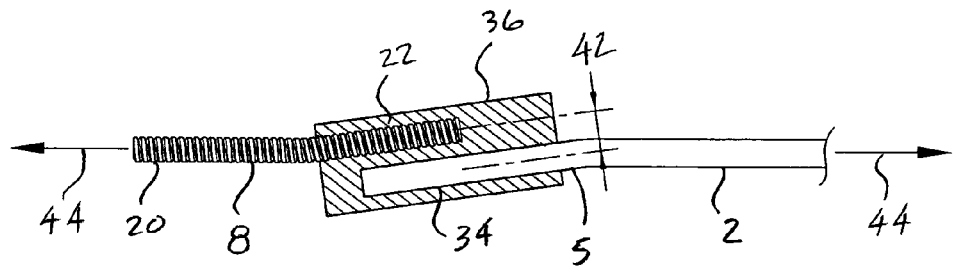
FIG. 3c is a cross-sectional view, taken along the tensile axis, and showing the connector assembly of FIG. 3a, including distortion due to applied tensile loads.

Since the straight portion of the spoke 2 is offset 42 from the fastener, the tensile loads 44 create a bending moment in the spoke 2 and the fastener 8 as illustrated in FIG. 3c. Spoke 2 and fastener 8 are both shown to be flexed in their unsupported region external to the coupling collar 36. Depending on the geometry of this arrangement and the tensile loads 44 involved, this may or may not present a problematic condition.

Figure 4A:
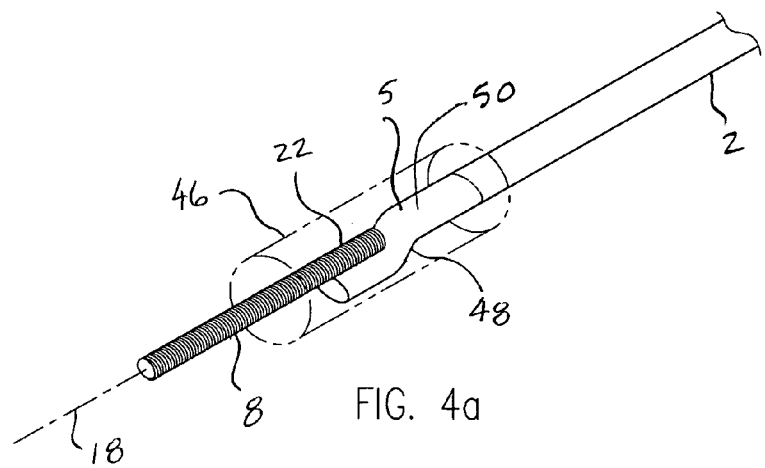
FIG. 4a is a partial perspective view of another embodiment of the present invention with the coupling collar in phantom, including an offset bend in the spoke.
Figure 4B:
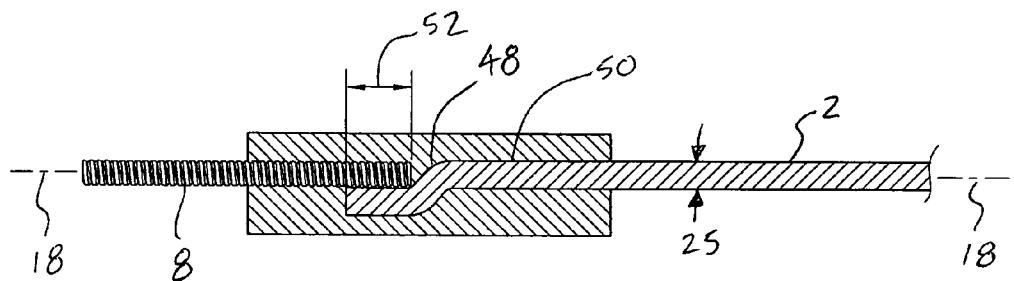

The embodiment described in FIGS. 4a-b describes an arrangement to overcome the bending moment described in FIG. 3c. Second portion 5 of spoke 2 includes an offset bend 48 as shown. This offset bend 48 is located within the engaged region 50 where the spoke 2 is encapsulated by the coupling collar 46. Thus, in the region external to the coupling collar 46, both the spoke 2 and the fastener 8 are now collinear with the tensile axis 18 and the bending illustrated in FIG. 3c does not occur. This offset bend 48 also serves to provide an overlap region 52 between the spoke 2 and the fastener 8 that is encapsulated by the coupling collar 46.

Figure 5:
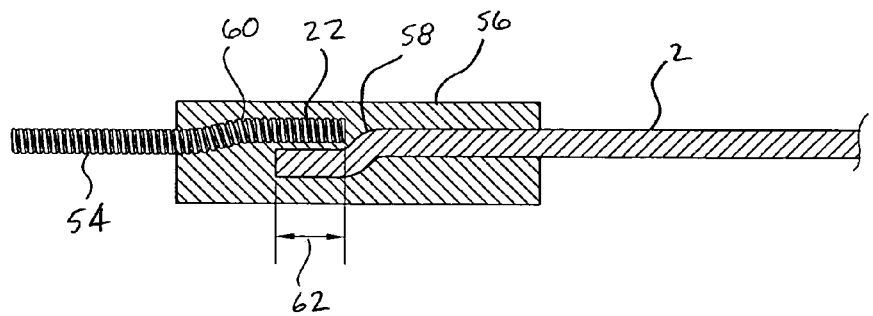
FIG. 5 is a cross-sectional view of another embodiment of the present invention, taken along the tensile axis, including an offset bend in both the spoke and the fastener.

FIG. 5 describes an embodiment similar to FIGS. 4a-b, however, in this figure both the fastener 54 and the spoke 2 include offset bends 60 and 58 respectively. The fastener 54 includes offset bend 60 within the encapsulated region where the fastener 54 is encapsulated by the coupling collar 56. The spoke 2 includes offset bend 58 within the encapsulated region where the second end 5 of the spoke 2 is encapsulated by the coupling collar 56. Since the offset is shared by both the fastener 8 and the spoke 2, the required offset of the offset bend 58 is less than the offset bend 48 of FIG. 4b. Offset bends 58 and 60 also serve to provide an overlap region 62 between the spoke 2 and the fastener 8 that is encapsulated by the coupling collar 56.

Figure 6:
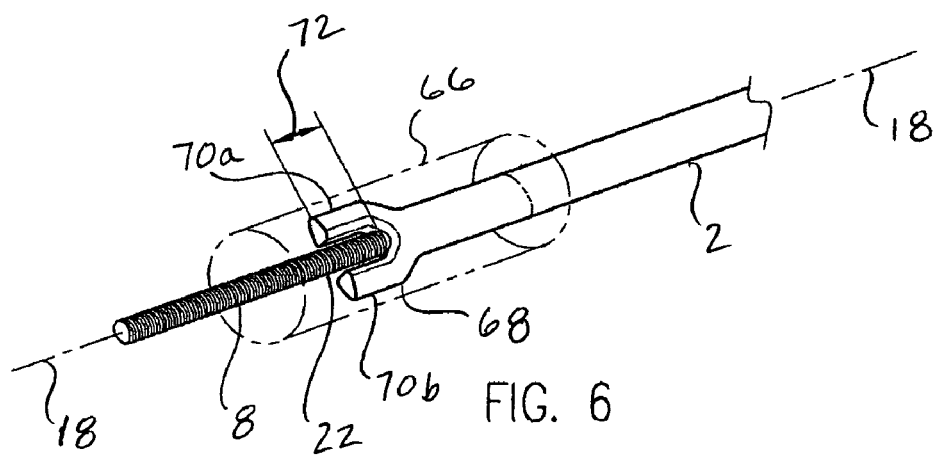
FIG. 6 is a partial perspective view of another embodiment of the present invention with the coupling collar in phantom, including a bifurcated spoke.

FIG. 6 describes a bifurcated or forked portion 68 formed within the second end 5 of the spoke 2. The forked portion 68 includes two tines 70a and 70b, with the second end 22 of fastener 8 positioned therebetween. The overlap region 72 between fastener 8 and spoke 2 is thereby provided, with both the spoke 2 and the fastener 8 collinear with the tensile axis 18. Forked portion 68 and overlap region 72 are encapsulated by the coupling collar 66 as previously described. Since tines 70a and 70b evenly straddle both sides of the fastener 8, the stresses at the interface between spoke 2 and coupling collar 66 are symmetrically balanced on either side of the tensile axis 18, as compared to the embodiments of FIGS. 4a-b and 5a-b.

Figure 7A:
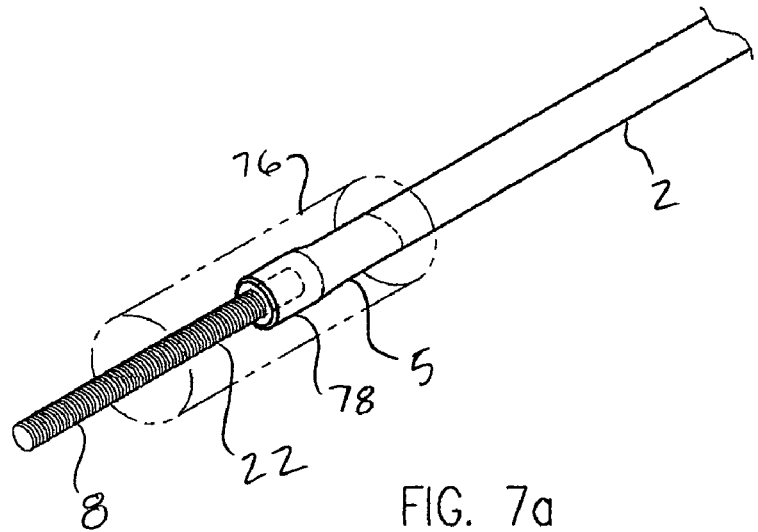
FIG. 7a is a partial perspective view of another embodiment of the present invention with the coupling collar in phantom, including a cupped end of the spoke.
Figure 7B:
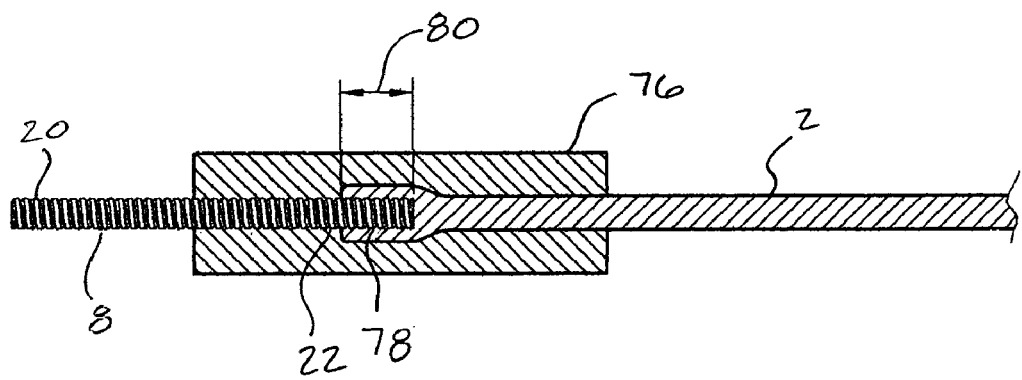

FIGS. 7a-b describes an embodiment where the spoke 2 is first joined to the fastener 8 prior to being overmolded by the coupling collar 76. As shown in FIG. 7b, an overlapping portion 78 of the second end 5 of spoke 2 surrounds the second end 22 of the fastener 8 in an overlap region 80. The overlap region 80 is encapsulated by the coupling collar 76. It is important to note that, in FIGS. 7a-b, the overlap portion 78 of the spoke 2 is in direct contact with the second end 22 of the fastener 8 and there is no coupling collar 76 material in between the two in the overlap region 80. Thus, there may exist a degree of structural connection between the spoke 2 and the fastener 8 in addition to any connection provided by the overmolded coupling collar 76. In addition, the second end 22 of fastener 8 may be pre-joined to the spoke 2 to create a pre-assembly of the two components. Thus, when the coupling collar 76 is molded in a manner similar to that described in FIGS. 2a-b, the single pre-assembled assembly is much easier to load into the mold of the overmolded coupling collar 76 than the two separate individual components. While such a direct contact is not described in any other of the embodiments of the present invention, it is anticipated that any of the embodiments may described herein may be configured to provide some degree of direct contact as described in FIGS. 7a-b.

Figure 8A:
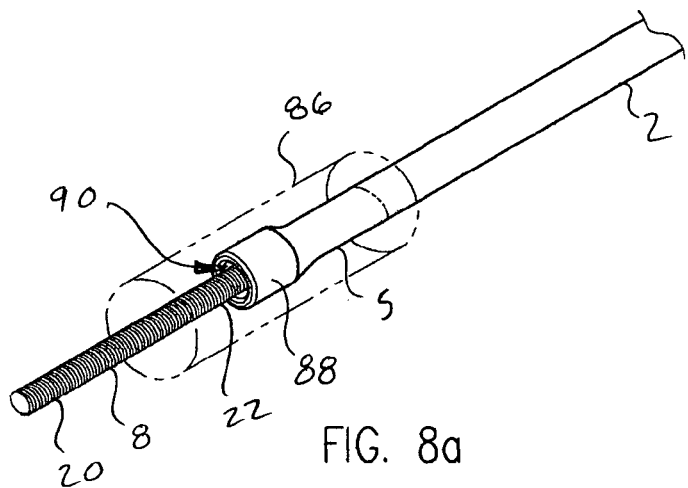
FIG. 8a is a partial perspective view of another embodiment of the present invention with the coupling collar in phantom, including a loose cupped end of the spoke.
Figure 8B:
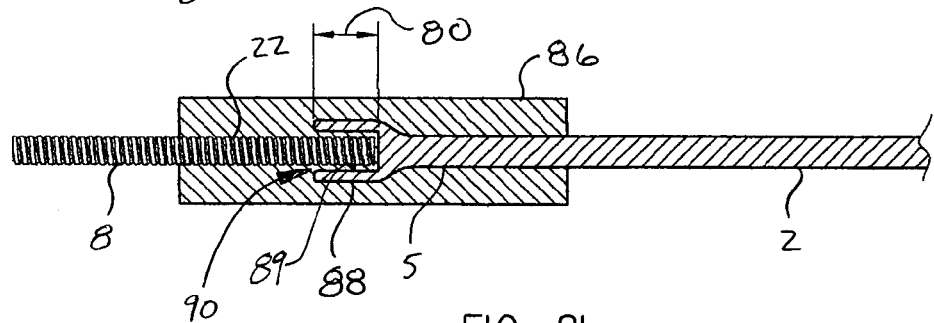

FIGS. 8a-b describe an embodiment similar to FIGS. 7a-b in that the second end 5 of spoke 2 surrounds the second end 22 of the fastener 8 in an overlap region 80. However in FIGS. 8a-b, the end 5 of spoke 2 includes a cup 88, with an internal cavity 89 that is larger than the second end 22 of fastener 8, providing a gap 90 therebetween. With gap 90, there is no direct contact between the cup 88 and the fastener 8. During molding, overmolded coupling collar 86 material is flowed therebetween to fill gap 90 as shown. With the gap 90 filled with overmolded coupling collar 86 material, there is a far greater surface area of contact between the spoke 2 and the coupling collar 86 than the embodiment described in FIGS. 4a-b, providing increased surface area of connection between the two. There is also greater surface contact between the fastener 8 and the coupling collar 86 for increased interlock area of engagement.

It is preferred that the spoke 2 be constructed from pultruded rod with high strength continuous fibers, including carbon fibers, in a thermoplastic resin matrix. The cup 88 may be formed in the second end 5 of spoke 2 by heating second end 5 and re-forming it using a purpose-built die. The coupling collar 86 may then be overmolded using resin, reinforced with discontinuous fibers, to surround the second end 5 and cup 88. In such an arrangement, the resin and fibers of the overmolded collar 86 are generally segregated from the resin and fibers of the spoke 2, except at the surface where the two contact where the resin of the spoke 2 may fuse with the resin of the overmolded coupling collar 86. With this arrangement, the orientation of the fibers of the overmolded coupling collar 86 may be random or may be oriented in a direction that is independent of the fiber orientation of the spoke 2. Also, the external geometry of the coupling collar 86 may be of any shape required to facilitate its function as a termination or its connection with the rim.

Figure 9A:
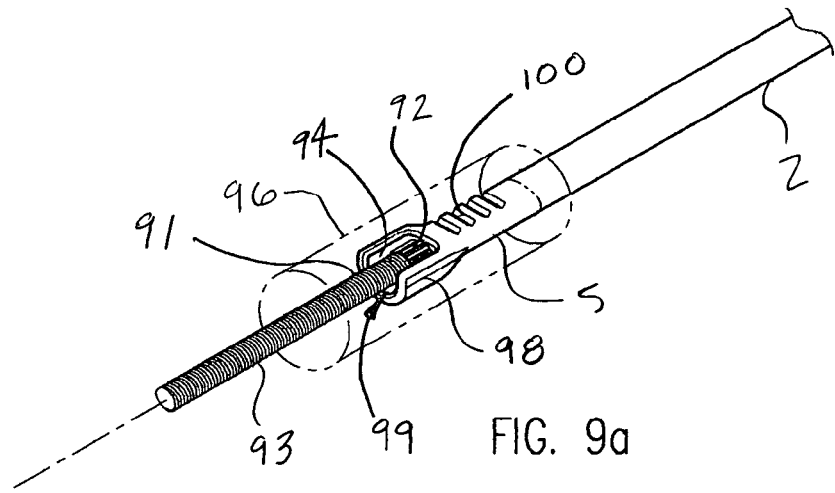
FIG. 9a is a partial perspective view of another embodiment of the present invention with the coupling collar in phantom, including a scooped end of the spoke.
Figure 9B:
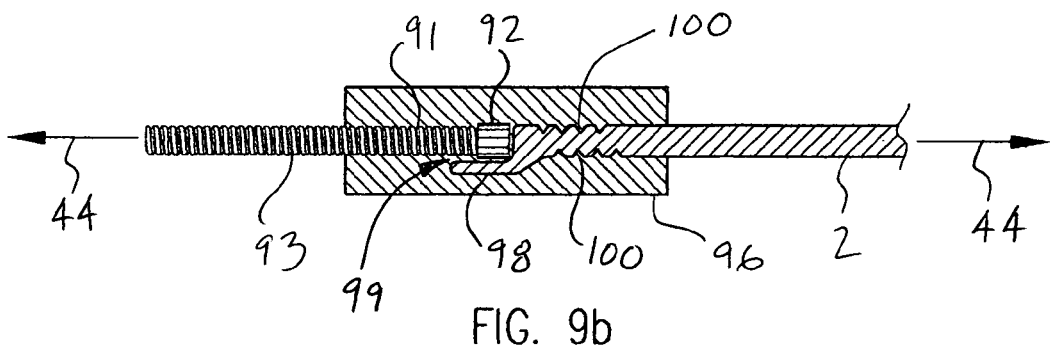
Figure 9C:
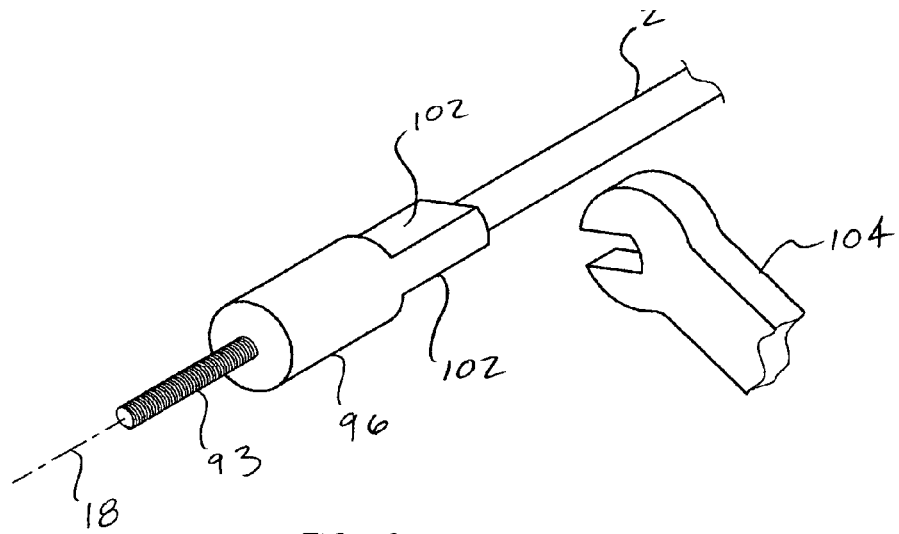
FIG. 9c is a partial perspective view of the embodiment of FIG. 9a, including flats for controlling rotation of the coupling collar.

FIGS. 9a-c describe an embodiment similar to FIGS. 8a-b, however the second end 5 of spoke 2 includes a scoop 98, rather than cup 88. The scoop 98 shape, by definition, includes an open side 94, which allows the overmolding coupling collar 96 material to flow more easily to fill the gap 99 between the scoop 98 and the second end 91 of fastener 93 during overmolding of the coupling collar 96. Second end 91 of fastener 93 also includes longitudinal knurls 92, which constitute a non-circular geometry. When overmolded coupling collar 96 is molded to surround the second end 91 of the fastener 93, it will also conform to the knurls 92. Upon solidification of the overmolded coupling collar, the fastener 93 is engaged therein to prevent the fastener 93 from twisting (relative to the overmolded coupling collar 96) about the tensile axis 18. Also shown are indents 100 in the second end of spoke 2. These indents 100 are encapsulated by overmolded coupling collar 96 material and serve to create mechanical interlock engagement between the spoke 2 and the coupling collar 96 to augment the connection therebetween and provide resistance to pullout due to tensile loads 44.

The coupling collar 96 is shown in greater detail in FIG. 9c to include cutout flats 102. It is often desirable to have the ability to grip the overmolded collar 96 to control its rotation about tensile axis 18. Thus flats 102 create a non-circular profile in the coupling collar 96 that will facilitate manual gripping with the fingers or permit engagement of a wrench 104. Thus flats 102 may be utilized to rotate the coupling collar 96 or else to hold the coupling collar 96 fixed and prevent unintentional rotation. As an alternative to flats 102, any manner of non-circular cross-section geometry may be incorporated within the assembly to control rotation of the coupling collar such as knurls, splines, indents, etc.

Figure 10A:
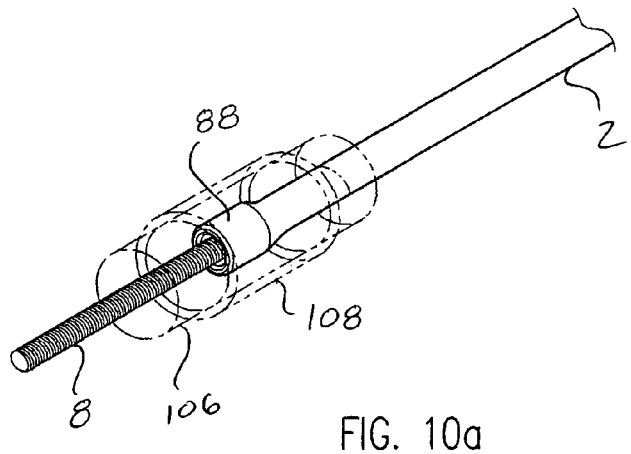
FIG. 10a is a partial perspective view of another embodiment of the present invention with the coupling collar in phantom, including an outer reinforcement collar.
Figure 10B:
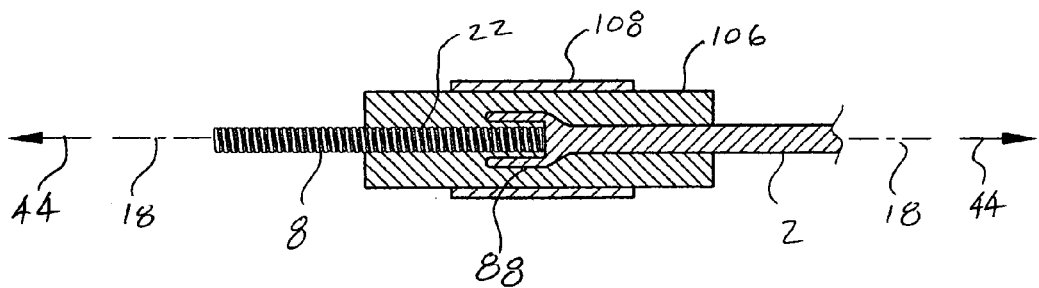

FIGS. 10a-b describe an embodiment similar to FIGS. 8a-b, however, the coupling collar 106 includes an outer collar 108 that surrounds the coupling collar 106. When this assembly is subject to tensile loads 44, the flared cup 88 and the interlocked threads of the fastener 8 may tend to wedge the coupling collar 106 apart slightly as they try to pull out of the coupling collar 106. This causes the coupling collar 106 to expand in a direction perpendicular to tensile axis 18 and potentially release the spoke 2 from the coupling collar 106. The outer collar 108 provides additional hoop strength reinforcement to the coupling collar 106 to resist this expansion and to keep all of the components in place. For this reason, it is preferred that the outer collar 108 be constructed of a relatively stiff material such as aluminum or steel that has inherently greater hoop stiffness than the coupling collar 106 material. The outer collar 108 may also serve to reinforce and protect the coupling collar 106.

Figure 11A:
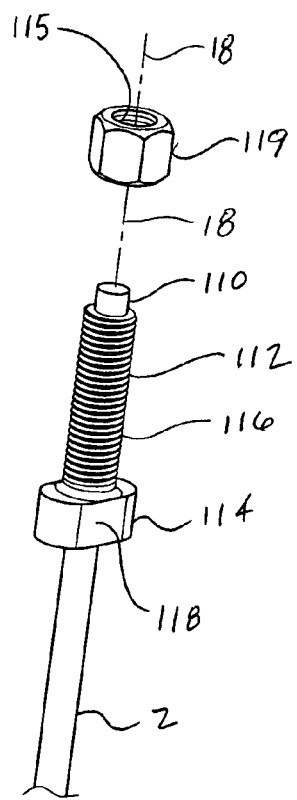
FIG. 11a is a partial perspective view of another embodiment of the present invention, including a threaded overmolded collar.
Figure 11B:
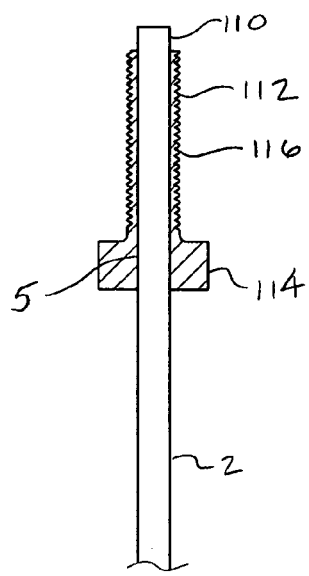

FIGS. 11a-b describe an embodiment where the fastener element 8 of the previous figures has been eliminated and the overmolded collar 116 instead includes geometry to directly facilitate anchoring of the spoke 2. Overmolded collar 116 includes a male-threaded shank 112 along its length and an enlarged portion 114 at one end. The enlarged portion 114 includes flats 118 that may be gripped by a wrench (not shown) to twist or to prevent twisting of the overmolded collar 116 about the tensile axis 18. As shown here, the second end 5 of spoke 2 extends through the overmolded collar 116 to create an exposed end 110. This exposed end 110 is helpful in molding of the collar 116 because it permits the exposed end 110 portion to be fixtured in the mold parting line (not shown) to keep the spoke aligned and centered in the mold cavity during molding of the overmolded collar 116. By fixturing the spoke 2 at both ends of the mold cavity during molding, the spoke cannot become deflected or misaligned during molding of the overmolded collar 116.

Nut 119, includes internal threads 115 to mate with male-threaded shank 112 to facilitate connection with a bracing element such as the rim (not shown). For example, shank 112 may extend through a hole in the rim (not shown), with the nut 119 threaded from the opposite side of the rim such that the nut 119 provides an overlie connection with the rim. Thus, nut 119 serves as an auxiliary connecting element to connect the overmolded collar 116 to the bracing element. Overmolded collar 116 may also be viewed as a connecting element to facilitate the connection of the spoke 2 with the bracing element.

While these figures show the overmolded collar 116 to be an end termination of the spoke 2, the overmolded collar 116 may alternatively be located at some point midway along the length of the spoke 2. In such a case, the spoke 2 would extend through the overmolded collar 116 and the exposed end 110 would extend further to create a second tensile span. Thus, the overmolded collar 116 could serve as an anchor point between two tensile spans.

Figure 11C:
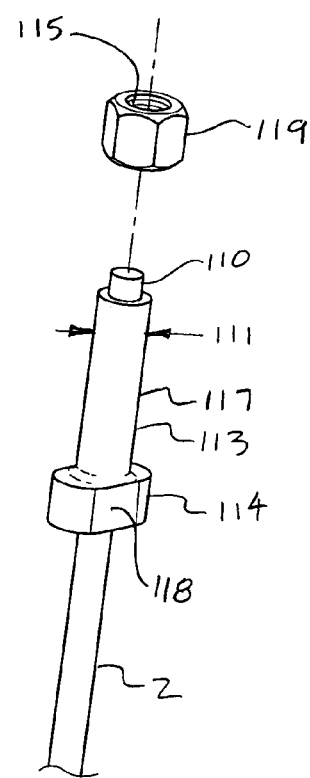
FIG. 11c is a partial perspective view of a still further embodiment of the present invention, including an overmolded collar without external thread.

FIG. 11c describes an embodiment similar to FIGS. 11a-b, however the overmolded collar 117 does not include external threads. Instead, the shank 113 of the overmolded collar 117 is generally smooth. Overmolded collar 117 also includes enlarged portion 114 and flats 118 similar to FIGS. 11a-b. In this embodiment, nut 119, with internal threads 115, is intended to thread onto shank 113 in a self-tapping engagement. Thus the nut 119 is preferably of harder material than the shank 113 and the action of threadably engaging the internal threads 115 with the shank 113 serves to deform the shank 113 to create external threads in the previously smooth shank 113. To create an optimal self-tapping engagement, it is usually desirable that the diameter 111 of the shank 113 be sized at the approximate pitch diameter of internal threads 115. This embodiment is an example of an arrangement where an auxiliary element (nut 119) is used to grip the sides of the collar (overmolded collar 117), with these sides oriented generally parallel to the tensile axis, to create an engagement to effectively terminate the tensile element (spoke 2). Of course, such a gripping action may be achieved with a wide variety of arrangements well known in industry, including arrangements that clamp, grip or engage the collar.

FIGS. 12a-b describe an embodiment similar to FIGS. 11a-b in that an overmolded collar 126 is utilized without a second tensile element such as a fastener. Overmolded collar 126 includes an enlarged portion 120 and a flared shoulder 122. While this overmolded collar 126 may serve as an anchor point to directly connect with the rim 129, the overmolded collar 126 is preferably made from a relatively soft polymer resin and, if the mating components are not well matched to the geometry of the overmolded collar 126, the mating surfaces may distort slightly under applied tensile loads 44. Therefore, it is preferable to utilize a ferrule 124 that includes a bearing surface 128 to mate with the flared shoulder 122. The bearing surface 128 is well-matched to the surface of the flared shoulder 122 to distribute the contact stresses over a broader surface-to-surface area, rather then a surface-to-edge type of contact. The ferrule 124 is preferably made of a harder material, such as aluminum. The spoke 2 extends through a hole 127 in the rim 129 as shown. Thus, it may be seen that the ferrule 124 serves as an intermediate connecting member to facilitate the connection between the spoke 2 and the rim 129. This embodiment also shows a general arrangement where the overmolded collar includes a bearing surface (shoulder 122) that creates a projected area of overlie that is perpendicular to the tensile axis to create an overlie engagement to effectively terminate the tensile element (spoke 2).

By increasing the depth 125 of the engaged region 123, the surface area of contact between the spoke 2 and the overmolded collar 126 is increased, resulting in a stronger connection between the two components to withstand spoke tensile loads. In this case, without overlapping tensile members, as described in previous embodiments, the depth 125 of engagement may need to be increased somewhat. It is generally desirable to have an engagement region 123 with a depth 125 that is at least 5 times the average cross sectional thickness 25 of the spoke 2 in the engagement region 123.

FIGS. 13*a-b* describe an embodiment similar to FIGS. 12*a-b*, however, the ferrule 124 is replaced by threaded collar 134. Overmolded collar 136 includes an enlarged portion 130 with a flared shoulder 132. One end of the overmolded collar 136 includes splines 133 to mate with a wrench (not shown) for rotational manipulation of the overmolded collar 136. Threaded collar 134 includes external threads 131 and flats 138 to mate with a wrench (not shown) for rotational manipulation of the threaded collar 134. The inside diameter of the threaded collar 134 includes a step 139 to create a closely matched bearing surface to mate with the flared shoulder 132 of the overmolded collar 136. Rim 135 includes a threaded hole 137. By utilizing separate wrenches on splines 133 and flats 138, the threaded collar 134 may be rotated independently from the over molded collar 136 about the tensile axis. Threaded collar 138 may be rotated relative to rim 135 to adjust the effective length of the spoke 2 span, thus adjusting the spoke tension. Thus, it may be seen that the threaded collar 134 serves as an intermediate connecting member to facilitate the connection between the spoke 2 and the rim 135.

The spoke 2 includes indents 141 to create a configured surface in the second end 5 of spoke 2. When overmolded collar 136 is molded around the spoke 2 insert, overmolded collar material fills indents 141, such that, upon solidification, a mechanical overlie interlock engagement exists between the spoke 2 and the overmolded collar 136. This mechanical interlock augments any welding or adhesion between the two components to strengthen the connection. Further, the indents 141 serve to increase the area of contact between the two components.

Figure 14A:
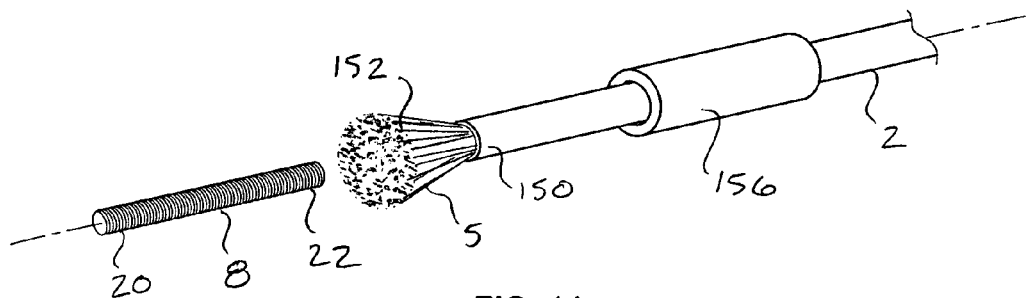
FIGS. 14a-c are partial perspective views of another embodiment of the present invention, and showing the sequence of operations involved in creating a connection assembly, including dry fibers and an outer collar.
Figure 14B:
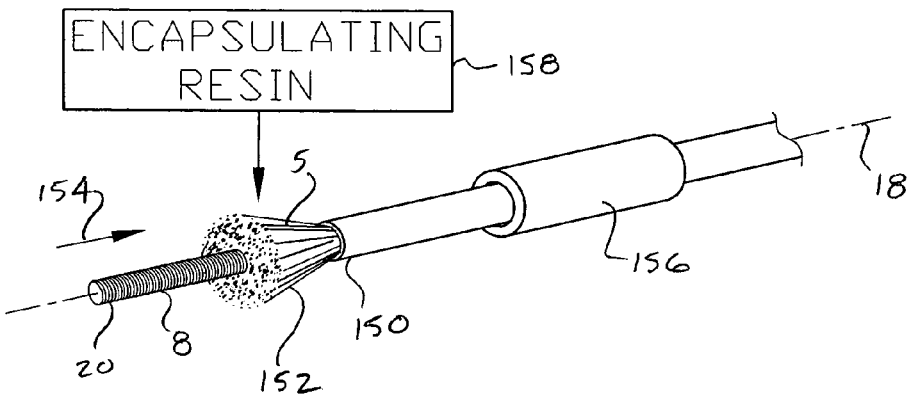
Figure 14C:
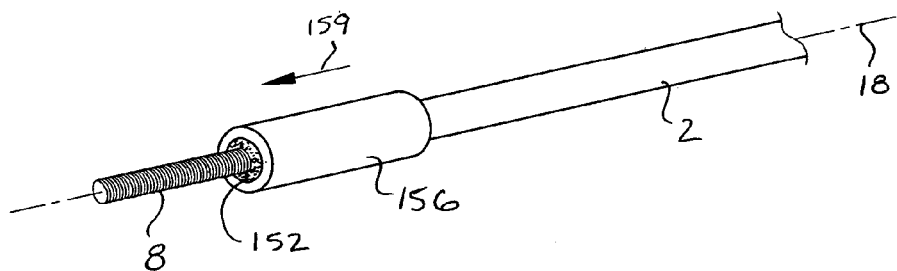
Figure 14D:
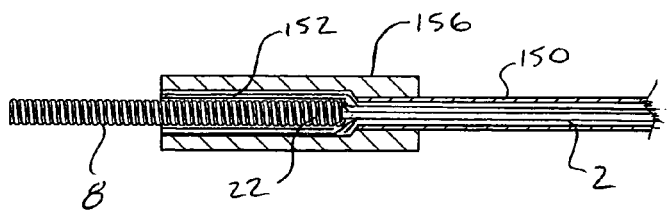
FIG. 14d is a cross-sectional view, taken along the tensile axis, and showing the connector assembly of FIGS. 14a-c.

FIGS. 14*a-d* describe an alternate embodiment that utilizes a spoke constructed of a bundle of longitudinal dry fibers. As shown here, it is preferable that the fibers 152 of spoke 2 include a jacket 150 to protect the fibers 152 in their exposed span. As shown in FIG. 14*a*, the jacket 150 is stripped off of the fibers 152 at the second end 5 of the spoke 2. These exposed fibers 152 are then splayed as shown to separate the individual filaments. Collar 156 is initially positioned on the spoke 2 below the exposed fibers 152 as shown in FIG. 14*a*. As shown in FIG. 14*b*, liquid encapsulating resin 158 is introduced onto the exposed fibers to encapsulate and impregnate these exposed fibers 152. The second end 22 of fastener 8 is then inserted in direction 154 and positioned to overlap amongst the exposed fibers with its first end 20 left exposed as shown. Note that the fibers 152 of spoke 2 now overlap the second end 22 of the fastener 8. Collar 156 is then slid up the spoke 2 in the direction 159 to sheath the exposed fibers 152 and compress these fibers 152 and the encapsulating resin 158 into the external threads of the second end 22 of the fastener 8 as shown in FIGS. 14*c* and 14*d*. Fibers 152 and liquid encapsulating resin 158 are thereby deformed and pressed to conform to the external threads of fastener 8. When the liquid encapsulating resin 158 is subsequently hardened and solidified, the fibers 152 and second end 22 of fastener 8 become solidly encapsulated and joined together by the solidified encapsulating resin 158. Both adhesion and mechanical interlock occur between the encapsulating resin 158 and both the fibers 152 and the fastener 8. A strong tensile connection is thereby created between the spoke 2 and the fastener 8. Thus, it may be understood that the encapsulating resin 158 constitutes a deformable connecting element that is integral with the fibers 152 of the spoke 2. Additionally, it may be seen that the collar 156 serves as a mold cavity to contain the encapsulating resin 158. For this embodiment, it is preferable that the liquid encapsulating resin be a thermoset polymer resin, such as epoxy, where the resin is hardened by chemical catalyzation. Many thermoset resins have excellent adhesive properties to augment the connection between the second end 22 of the fastener 8 and the fibers 12.

Figure 15A:
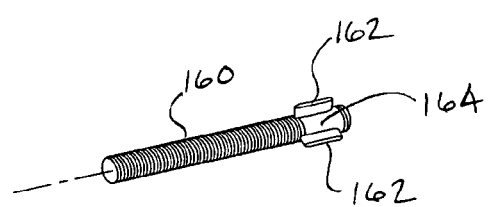
FIG. 15a is a perspective view of an alternate fastener that may be substituted in the assembly of FIGS. 14a-c, including extensions.
Figure 15B:
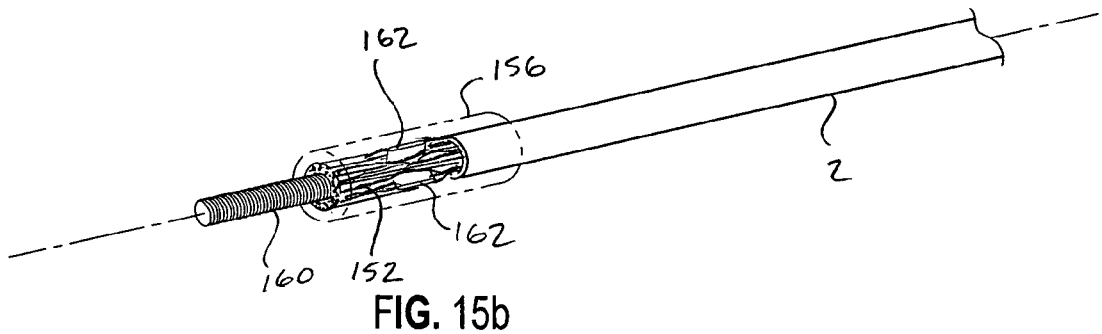
FIG. 15b is a partial perspective view of the connector assembly of FIG. 14c, including the fastener of FIG. 15a, with the collar in phantom.

FIGS. 15*a-b* describe a modified fastener 160 to replace fastener 8 as utilized in the embodiment of FIGS. 14*a-d*. Fastener 160 includes extensions 162 formed onto its second end 164. Fastener 160, fibers 152 and collar 156 are assembled in a manner similar to that described in FIGS. 14*b* and 14*c*. With the collar 156 slid into place, the fibers 152 are diverted around extensions 162 so that extensions 162 are engaged by fibers 152 as shown in FIG. 15*b*. A degree of interlock engagement is thereby created between the fastener 160 and the fibers 152 to fortify the connection therebetween. In addition the amount of surface area of contact is increased as compared with the fastener 8 of FIGS. 14*a-d*.

Figure 16A:
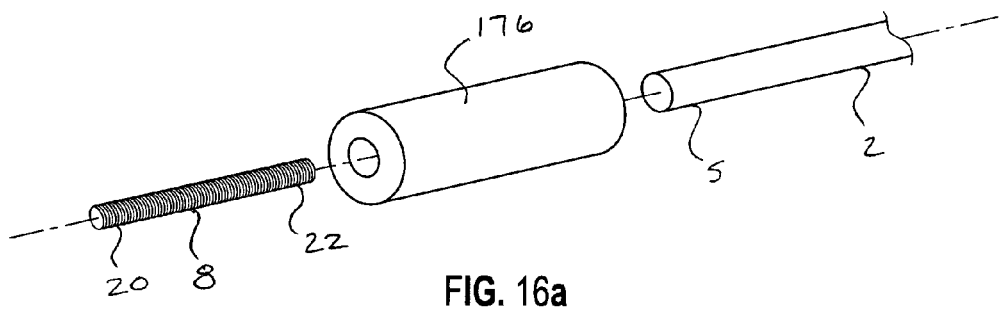
FIG. 16a is a partial perspective view of an additional embodiment of the present invention, in exploded assembly, prior to crimping of the collar.
Figure 16B:
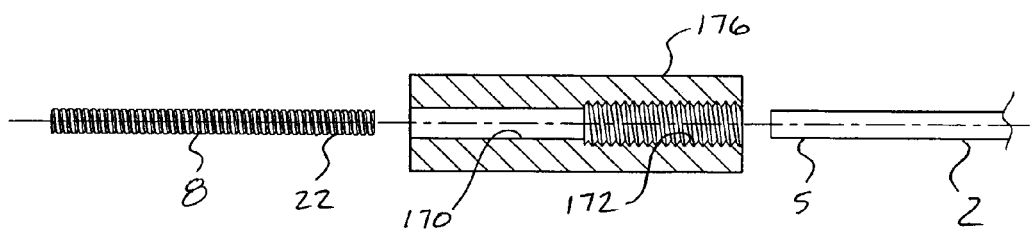
FIGS. 16b-d are cross-sectional views, taken along the tensile axis, and showing the embodiment of FIG. 16a in a sequence of operations involved in creating a connector assembly, including a crimped outer collar.
Figure 16C:
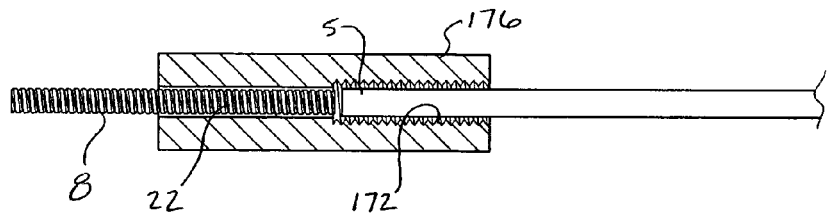

FIGS. 16*a-e* describe an embodiment where the coupling collar 176 is plastically deformed to grip both the fastener 8 and the second end 5 of the spoke 2. As shown in FIG. 16*a*, threaded fastener 8 is as previously described and includes first end 20 and second end 22. Spoke 2 is shown here to be generally round in cross-section and includes second end 5. As shown in FIG. 16*b*, coupling collar 176 includes a smooth hole 170 that is sized to provide a clearance fit with the outside diameter of fastener 8. At its opposite end, coupling collar 176 includes a knurled or threaded hole 172 whose inside diameter is sized to provide a close clearance fit with the outside diameter of the spoke 2. Hole 170 is preferably collinear with hole 172. In the pre-assembly described in FIG. 16*c*, the second end 22 of fastener 8 is positioned in hole 170 and the second end 5 of spoke 2 is positioned in hole 172.

Figure 16D:
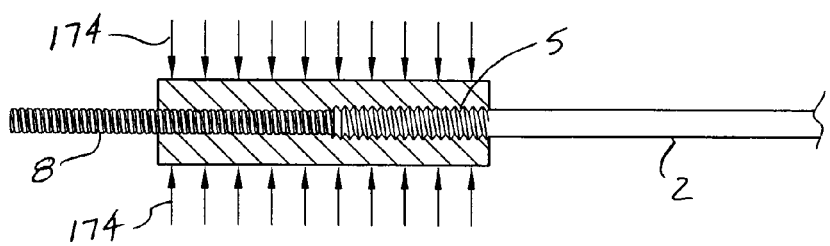
Figure 16E:
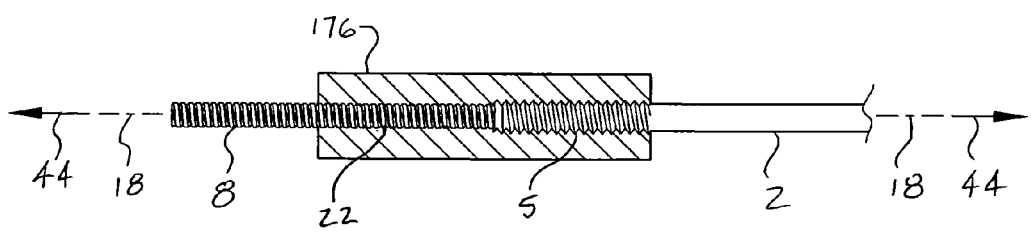
FIG. 16e is a cross-sectional view, taken along the tensile axis, and showing the embodiment of FIG. 16d, including applied tensile load.

The coupling collar 176 is then swaged or crimped or otherwise deformed as shown in FIG. 16*d* where external forces 174 are applied to the outside of the coupling collar 176. External forces 176, due to the crimping or swaging processes, serve to deform and shrink the coupling collar 176, thereby shrinking hole 170 into intimate contact with the second end 22 of the fastener 8 and shrinking hole 172 into intimate contact with the second end 5 of the spoke 2. As described FIG. 16*d*, when hole 170 is shrunk onto fastener 8, the external threads of fastener 8 emboss the walls of hole 170, causing the hole 170 to be embossed or plastically deformed to conform and mate with the external threads of fastener 8. Also, when hole 172 is shrunk onto the second end 5 of spoke 2, internal threads of hole 172 cause the spoke 2 to be embossed or plastically deformed to conform and mate with the internal threads of hole 172. Coupling collar 176 now has an overlie engagement that mates and grips the fastener 8 and the spoke 2, an effective tensile connection is thereby achieved to support tensile load 44 as shown in FIG. 16*e*. The external threads of fastener 8 and the internal threads of hole 172 are merely representative of configured embossing surfaces. Other configured surfaces, such as knurled surfaces, may be substituted. While it may be beneficial to have an embossed engagement between the coupling collar 176 and the fastener 8 and/or the spoke 2, it is also envisioned that hole 172 and the second end 5 of spoke 2 may alternatively be smooth surfaces, resulting in a frictional gripping engagement between the coupling collar 176 and the spoke 2.

Based on the deformation involved in this embodiment, it is desirable that the coupling collar 176 be made of a material whose hardness falls somewhere between the hardness of the fastener 8 and the hardness of the spoke 2. Fastener 8 is of greater hardness than coupling collar 176 and collar 176 is of greater hardness than the second end 5 of spoke 2. For example, the fastener 8 may be of stainless steel material and the coupling collar 176 may be of aluminum alloy and the second end 5 of the spoke 2 may be of fiber reinforced polymer.

Figure 17A:
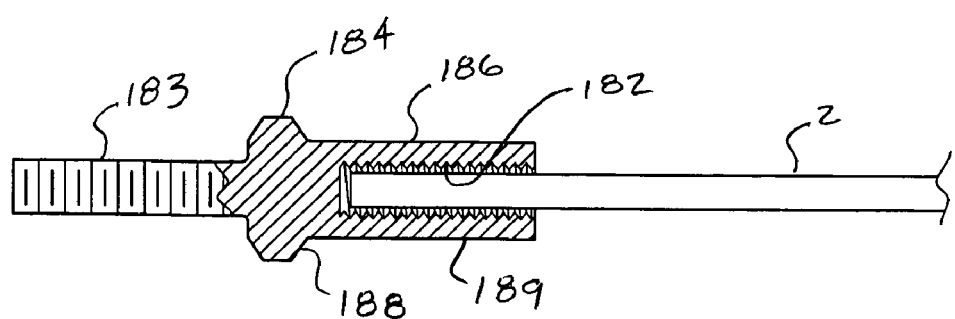
FIGS. 17a-b are cross-sectional views, taken along the tensile axis, and showing an additional embodiment of the present invention in a sequence of operations involved in creating a connector, including a crimped collar.
Figure 17B:
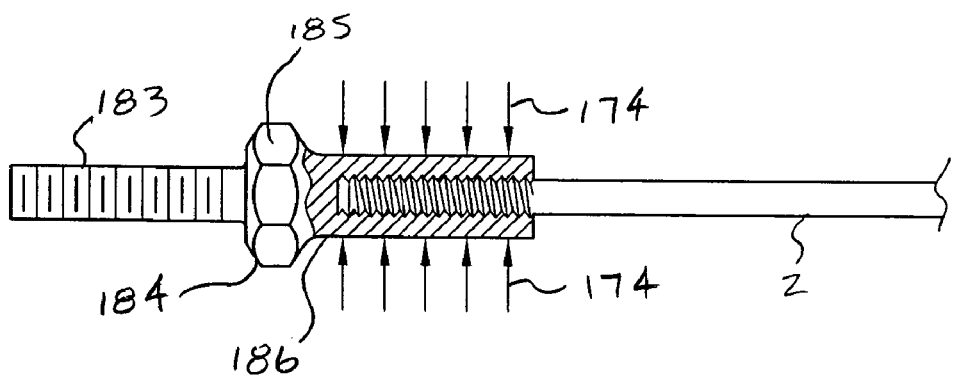

FIGS. 17*a-b* Describe an embodiment similar to FIGS. 16*a-e*, however the fastener 8 is now shown to be integral with the collar 186. As shown in FIG. 17*a*, collar 186 includes threaded or knurled hole 182 whose inside diameter is sized to provide a close clearance fit with the outside diameter of the second end 5 of spoke 2. Collar 186 includes an integral male-threaded fastener portion 183, an enlarged portion 184 with flats, a flared shoulder 188 and a shank 189. The outside of shank 189 is then swaged or crimped as shown in FIG. 17*b* where external forces 174 are applied to the outside of the collar 186. External forces 174 due to the crimping or swaging processes serve to shrink the collar 176, thereby shrinking hole 182 into intimate contact with the second end 5 of the spoke 2 in a manner previously described in FIGS. 16*a-e*. An effective connection between the collar 186 and the spoke 2 is thereby achieved. An intermediate connecting component, such as a spoke nipple, may be threaded onto the fastener portion 183 for connection to a bracing element such as the rim or hub flange (not shown). Alternatively, the fastener portion 183 may be directly threaded to engage the rim or hub. Collar 186 may now serve as a connecting element to connect the spoke 2 to a bracing element. Flats 185 formed into enlarged portion 184 allow the collar 186 to be rotatably manipulated about the tensile axis 18. Alternatively the enlarged portion 184 may be utilized to create an overly engagement to engage the rim or hub flange in a manner similar to a spoke nipple.

Figure 18A:
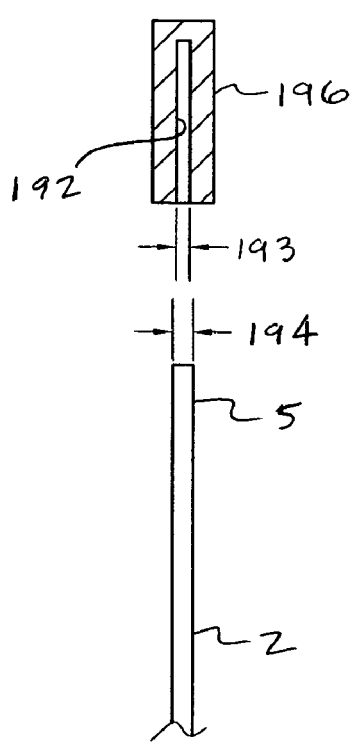
FIGS. 18a-b each show a cross-sectional view, taken along the tensile axis, of an additional embodiment of the present invention, and showing a sequence of operations involved in welding a collar onto a spoke.
Figure 18B:
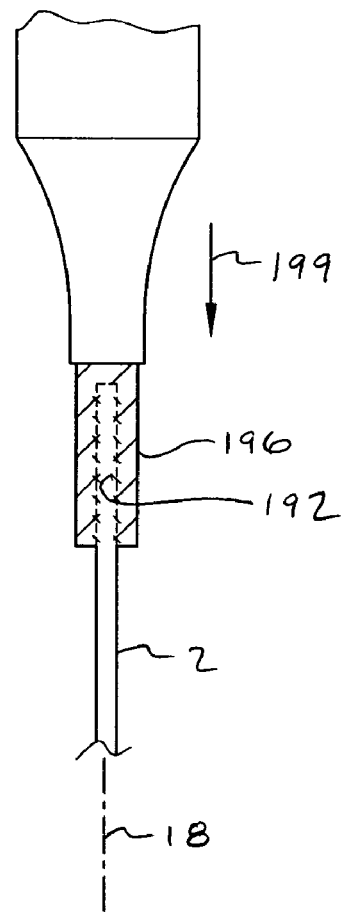

FIGS. 18*a-b* describe an embodiment where mechanical energy is utilized to weld a preformed collar 196 to the second end 5 of a spoke 2. The components are shown in FIG. 18*a* prior to assembly. Collar 196 includes hole 192 that is sized to be smaller in diameter 193 than the mating diameter 194 of the second end 5 of the spoke 2 to create an interference fit between the two components. Collar 196 is made of a thermoplastic polymeric material, preferably including reinforcement fibers. Spoke 2 is preferably constructed of a thermoplastic polymer resin matrix with fiber reinforcement. It is preferable that both the preformed collar 196 and the spoke 2 are made from identical or otherwise chemically compatible matrix resins.

As shown in FIG. 18*b*, an ultrasonic horn 198 is excited with ultrasonic energy and pressed against the collar 196, driving collar 196 in the direction 199. The ultrasonic energy transmitted by the horn 198 causes both the hole 192 of the collar 196 and the second end 5 of the spoke 2 to simultaneously melt at the interface where they contact, permitting the two components to fit together and become welded. In a welded assembly, the adjoining materials of the two welded components deform to flow and become fused together. Such ultrasonically welded assembly of such cylindrical components is well known in industry. Alternatively, other welding methods may be utilized, such as spin-welding or other processes known in industry. In the case of spin welding, the collar 196 would be rotated relative to the second end 5 to create frictional heat to melt these mating surfaces and weld them together. The result is a welded connection between the collar 196 and the spoke 2 to create an enlarged termination of the spoke 2. The collar 196 may then be connected to a bracing element in any manner commensurate with the desired application. As an example, the spoke may then be connected to a bracing element in a manner as described in FIGS. 12*a-b*.

This method of ultrasonic heating may alternatively be utilized to temporarily soften the material of the collar to conform and engage a configured surface of the spoke. For example, the collar may be ultrasonically inserted over the knurled end of a steel spoke, causing the collar to soften and deform to conform to the knurled surface of the steel spoke.

Figure 19A:
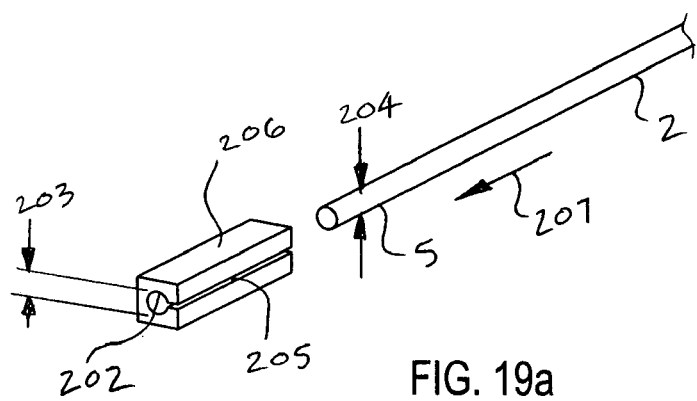
FIGS. 19a-c each show a partial perspective view, of an additional embodiment of the present invention, and showing a sequence of operations involved in welding a collar onto a spoke.
Figure 19B:
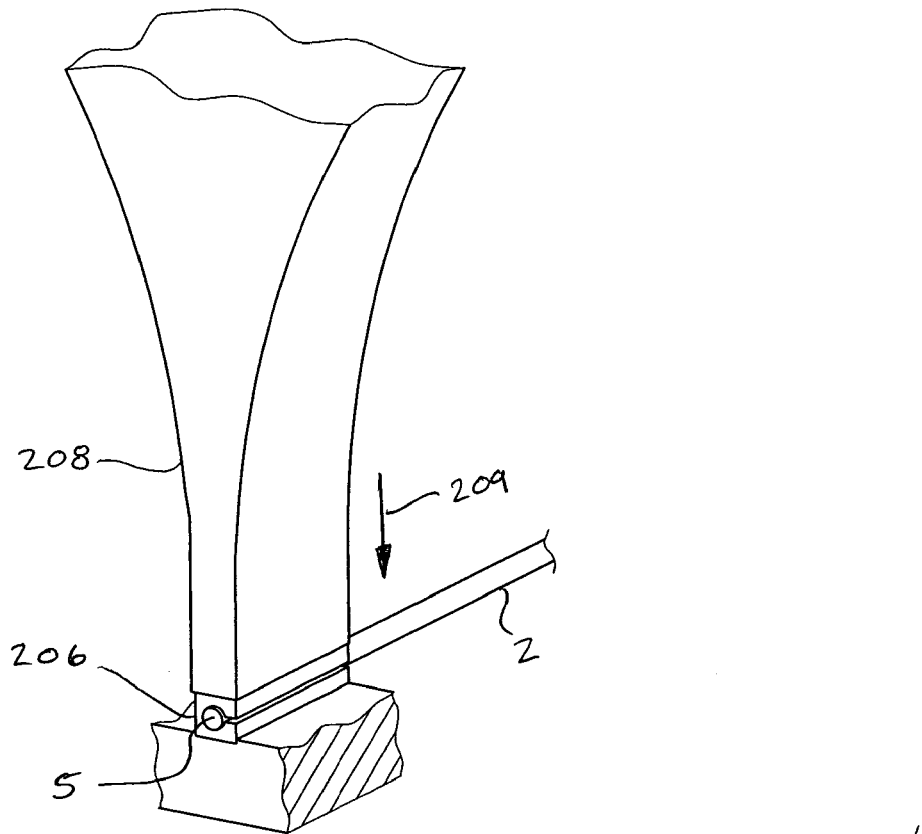
Figure 19C:
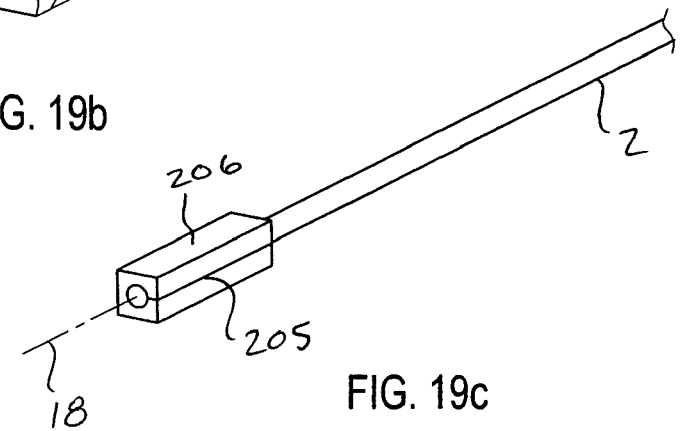

FIGS. 19*a-c* describe another embodiment where a collar 206 is welded to the second end 5 of a spoke 2. Collar 206 is made of thermoplastic polymer material and includes hole 202 and a longitudinal slot 205 as shown. The diameter 203 of hole 202 is sized to correspond to the diameter 204 of the second end 5 of spoke 2, permitting the second end 5 to easily assemble with hole 202. Spoke 2 is constructed of a thermoplastic polymer resin matrix with fiber reinforcement as described herein above. Second end 5 is inserted into hole 202 in direction 207 and energized ultrasonic horn 208 is pressed against collar 206 in the direction 209. Slot 205 permits the collar 206 to flex in the direction 209. With the second end 5 inserted in hole 202, ultrasonic energy supplied by the horn 208 causes the second end 5 and the collar 206 to melt and become welded at the interface where their surfaces contact. Slot 205 also allows collar 206 to flex during welding to permit the ultrasonic energy to penetrate more effectively to the welding interface between the second end 5 and the hole 202. As shown in FIG. 19*c*, slot 205 becomes closed and welded together during welding. As shown previously in FIGS. 18*a-b*, the ultrasonic horn 198 was pressed against the collar 196 in a direction generally parallel to the tensile axis 18. However, In FIGS. 19*a-b*, the ultrasonic horn 208 is pressed against the collar 206 in a direction generally perpendicular to the tensile axis 18. It should be understood that the embodiments described in FIGS. 18*a-b* and FIGS. 19*a-c* are not limited to spokes of round cross-section. Any cross-sectional shape may be employed, as long as shape of the spoke is generally matched to the hole of the collar.

FIGS. 20*a-d* describe an embodiment similar to FIGS. 13*a-b*, however the overmolded collar 136 is eliminated and an enlarged portion or head 140 is formed directly onto the second end 5 of the spoke 2. It is preferable that the spoke 2 of this embodiment be of the type with continuous fibers encapsulated in a thermoplastic resin matrix. FIGS. 20*a-b* show how such a spoke 2 may be formed to include an enlarged portion 140. Spoke 2 is clamped in a mold 144 with the second end 5 of the spoke 2 extending into the mold cavity 145. The second end 5 of spoke 2 is heated to its softening point and ram 146 is brought down to deform the second end 5 of the spoke 2 to conform to the mold cavity 145 and form an enlarged portion 140 directly onto the spoke 2. Note that this is merely a representative method of forming such an enlarged portion 140. A wide range of alternate forming techniques may be utilized that are well known in industry. For example, ram 146 may be replaced by an ultrasonic horn, where ultrasonic energy is used to soften and deform the second end 5 of spoke 2. After deformation, the result is an enlarged portion 140 formed on the second end 5 of spoke 2 as illustrated in FIG. 20*c*. It should be noted that the fibers of spoke 2 may extend within the enlarged portion 140 to create uninterrupted structural connection between the spoke 2 and the enlarged portion 140.

A threaded collar 134, identical to that shown in FIGS. 13a-b, may be utilized in a similar manner with flared shoulder 148 of the enlarged portion 140 matched to step 139 of the threaded collar 134 to create a matched bearing surface interface. Rim 135 includes a threaded hole 137. By utilizing a wrench on flats 138, the threaded collar 134 may be rotated about the tensile axis 18 to adjust the threaded engagement between the threads 131 of threaded collar 134 and the threaded hole 137 of the rim 135.

In the embodiment of FIG. 21, the spoke 2 includes an enlarged portion 218 formed directly in the second end 5 of the spoke. The spoke 2 may be of metallic material, such as stainless steel or of composite material, preferably of the type with continuous high-strength fibers encapsulated in a thermoplastic resin matrix. Overmolded collar 216 is molded around the second end 5 of spoke 2, including enlarged portion 218. Shoulder 220 of overmolded collar 216 serves to bear against a bracing surface such as the rim or hub flange (not shown) in an overlie engagement. Thus, the overmolded collar 216 is engaged to the spoke 2 by an overlie engagement between the enlarged portion 218 and the overmolded collar 216 to resist spoke tensile loads.

While my above description contains many specificities, these should not be construed as limitations on the scope of the invention, but rather as exemplifications of embodiments thereof.

While the above description is particularly focused on bicycle spokes as tensile elements, and this is the preferred embodiment of the present invention, it is envisioned that the present invention may be adapted to applications involving a wide range of tensile element applications outside of bicycle wheel applications. Some example applications may include control cables, guy wires, fiber optic cables, overhead high-tension lines, architectural and infrastructure cabling, pre-stressed rebar, etc.

While the termination or coupling of the present invention may be directly connected to the bracing element (such as the rim or the hub), there are many cases where it is desirable to include one or more auxiliary components to serve as intermediary components to facilitate this connection. For example, the termination or coupling may engage the auxiliary component and the auxiliary component may engage the bracing element.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A tensile connector assembly comprising:
a longitudinal tensile element having an end portion and a cross-section thereof, wherein said longitudinal tensile element is at least a portion of a vehicle wheel spoke and wherein said spoke has a first end connected to a hub and a second end connected to an outer rim;
an overmolded connecting element;
an additional element, which is one of said rim and said hub that anchors said longitudinal tensile element;
a tensile axis of applied tensile load along said longitudinal tensile element;
wherein said overmolded connecting element surrounds the cross-section of said longitudinal tensile element, with an overlapping engagement therewith;
wherein said overmolded connecting element is joined to said longitudinal tensile element by means of an overmolded connection;
wherein said overmolded connecting element comprises hardened molding material with a conformable and softened state and a solidified and hardened state;
wherein said longitudinal tensile element is integrally fixed to said hardened molding material;
including a second tensile element joined to said longitudinal tensile element, wherein said overmolded connecting element serves as a coupling element to join said second tensile element to said longitudinal tensile element;
wherein said overmolded connecting element contacts both said longitudinal tensile element and said second tensile element;
including an overlap region, wherein said longitudinal tensile element overlaps said second tensile element along said tensile axis at said overlap region; and
wherein at least one of said longitudinal tensile element and said second tensile element includes a lateral offset portion, wherein said lateral offset portion is laterally offset from said tensile axis.

2. A tensile connector assembly according to claim 1, wherein said overmolded connecting element surrounds the cross-section of both said longitudinal tensile element and said second tensile element.

3. A tensile connector assembly according to claim 1, wherein said overmolded connecting element includes non-circular cross-section geometry to mate with corresponding geometry of at least one of said longitudinal tensile element and said second tensile element to prevent rotation between said overmolded connecting element and at least one of said longitudinal tensile element and said second tensile element.

4. A tensile connector assembly according to claim 1, wherein said overmolded connecting element includes reinforcement fibers in a matrix and wherein said reinforcement fibers span across the joint between said longitudinal tensile element and said second tensile element along said tensile axis.

5. A tensile connector assembly according to claim 1, wherein a portion of said overmolded connecting element extends within a region between said longitudinal tensile element and said second tensile element in said overlap region.

6. A tensile connector assembly according to claim 1, wherein said longitudinal tensile element and said second tensile element contact each other.

7. A tensile connector assembly according to claim 6, wherein said longitudinal tensile element is interlocked and engaged to said second tensile element in said overlap region.

8. A tensile connector assembly according to claim 1, wherein said longitudinal tensile element includes geometry to surround the cross section of said second tensile element and to overlap said second tensile element in said overlap region.

9. A tensile connector assembly according to claim 1, wherein said longitudinal tensile element includes a forked portion and wherein said forked portion straddles said second tensile element to overlap said second tensile element in said overlap region.

10. A tensile connector assembly according to claim 1, wherein said longitudinal tensile element includes a straight end portion, wherein said straight end portion is generally collinear with said tensile axis and wherein said straight end geometry overlaps said second tensile element in said overlap region.

11. A tensile connector assembly according to claim 1, wherein said longitudinal tensile element includes high strength fibers and wherein at least a portion of said high strength fibers are aligned to be generally parallel to said tensile axis.

12. A tensile connector assembly according to claim 11, wherein said high strength fibers are generally continuous fibers.

13. A tensile connector assembly according to claim 12, wherein said fibers are unsupported dry fibers.

14. A tensile connector assembly according to claim 12, wherein said overmolded connecting element is formed directly within said longitudinal tensile element, constituting an enlarged portion of enlarged cross-sectional geometry of said longitudinal tensile element and wherein said high strength fibers are encapsulated in a matrix and wherein said continuous fibers extend within said enlarged portion.

15. A tensile connector assembly according to claim 14, wherein said high strength fibers are encapsulated in a matrix and wherein said matrix is a thermoplastic polymer resin matrix.

16. A tensile connector assembly according to claim 12, wherein said high strength fibers of said longitudinal tensile element extend within said overmolded connecting element.

17. A tensile connector assembly according to claim 16, including a second tensile element connected to said overmolded connecting element, wherein said second tensile element includes a configured surface, with said overmolded connecting element conforming to said configured surface, and wherein said configured surface is engaged to said overmolded connecting element along said tensile axis.

18. A tensile connector assembly according to claim 1, wherein said longitudinal tensile element includes high strength fibers and wherein said high strength fibers are encapsulated in a matrix.

19. A tensile connector assembly according to claim 18, wherein said matrix is at least one of a thermoplastic polymer resin and a thermoset polymer resin matrix.

20. A tensile connector assembly according to claim 1, wherein said overmolded connecting element is formed in a mold.

21. A tensile connector assembly according to claim 20, including a second tensile element, wherein at least one of said longitudinal tensile element and said second tensile element are over-molded to form said overmolded connecting element.

22. A tensile connector assembly according to claim 20, wherein said hardened molding material is formed via a high pressure molding process, selected from the series of injection molding and die casting.

23. A tensile connector assembly according to claim 1, wherein said longitudinal tensile element is adhered to said hardened molding material.

24. A tensile connector assembly according to claim 1, including a pre-formed outer collar adjacent said hardened molding material, wherein said outer collar constitutes at least a portion of said mold.

25. A tensile connector assembly according to claim 1, including surface adhesion between said overmolded connecting element and said longitudinal tensile element to provide resistance to pullout of said longitudinal tensile element due to said tensile load.

26. A tensile connector assembly according to claim 1, including a tensile load along said tensile axis, wherein said longitudinal tensile element includes a configured surface and wherein said overmolded connecting element is engaged with said configured surface to create a mechanical interlock connection to provide resistance to pullout of said longitudinal tensile element due to said tensile load.

27. A tensile connector assembly according to claim 26, wherein said configured surface includes helical threads.

28. A tensile connector assembly according to claim 26, wherein said configured surface includes enlarged cross-sectional geometry for overlie engagement with said overmolded connecting element.

29. A tensile connector assembly according to claim 1, wherein said longitudinal tensile element includes non-circular cross-section geometry to engage with corresponding geometry of said overmolded connecting element to limit rotation of said longitudinal tensile element with respect to said overmolded connecting element about said tensile axis.

30. A tensile connector assembly according to claim 1, wherein said longitudinal tensile element extends through said overmolded connecting element to include at least two exposed portions along said tensile axis.

31. A tensile connector assembly according to claim 30, wherein said at least two exposed portions constitute two structural tensile spans, wherein each of said two structural spans may independently support tensile loads.

32. A tensile connector assembly according to claim 1, including an auxiliary element that is connected to said tensile connector assembly, wherein said auxiliary element is engaged to said additional element.

33. A tensile connector assembly according to claim 32, wherein said auxiliary element is threadably engaged to said tensile connector assembly.

34. A tensile connector assembly according to claim 33, wherein said auxiliary element is threadably engaged to at least a portion of said tensile connector assembly.

35. A tensile connector assembly according to claim 34, wherein said overmolded connecting element includes a smooth shank portion and wherein said auxiliary element includes an internally threaded surface and wherein said internally threaded surface of said auxiliary element is threadably engaged to said smooth shank portion to create a thread-forming threaded engagement between said auxiliary element and said overmolded connecting element.

36. A tensile connector assembly according to claim 32, wherein said auxiliary element is threadably engaged to said additional element.

37. A tensile connector assembly according to claim 32, wherein said overmolded connecting element is embossed by said auxiliary element such that said overmolded connecting element engages said auxiliary element.

38. A tensile connector assembly according to claim 32, including an overlie engagement of matched surface-to-surface bearing contact between a surface of said auxiliary element and a surface of said overmolded connecting element, wherein said overlie engagement provides blocking to resist said tensile load.

39. A tensile connector assembly according to claim 1, wherein said overmolded connecting element includes reinforcement fibers in a matrix.

40. A tensile connecting assembly according to claim 39, wherein at least a portion of said fibers are greater than 4 millimeters in length.

41. A tensile connector assembly according to claim 1, wherein said overmolded connecting element constitutes an enlarged portion fixed to said longitudinal tensile element and wherein said enlarged portion provides an overlie engagement for connection between said overmolded connecting element and said additional element.

42. A tensile connector assembly according to claim 41 wherein said enlarged portion is formed directly into said longitudinal tensile element.

43. A tensile connector assembly according to claim 41, wherein said overlie engagement is a direct overlie engagement, including direct overlie engagement between said overmolded connecting element and said additional element.

44. A tensile connector assembly according to claim 41, including an auxiliary element, wherein said overlie connection occurs between said overmolded connecting element and said auxiliary element.

45. A tensile connector assembly according to claim 1, wherein said overmolded connecting element includes non-circular external geometry to facilitate gripping for the rotational manipulation of said overmolded connecting element about said tensile axis.

46. A tensile connector assembly according to claim 1, including an outer collar adjacent said overmolded connecting element, wherein said outer collar provides reinforcement to said overmolded connecting element.

47. A tensile connector assembly according to claim 1, including an engagement region between said overmolded connecting element and said longitudinal tensile element and a depth of said engagement region along said tensile axis, wherein said depth of said engagement region is 4 times the average cross sectional thickness of said longitudinal tensile element in said engagement region.

48. A tensile connector assembly according to claim 1, wherein the material of said overmolded connecting element is generally segregated from the material of said longitudinal tensile element.

49. A tensile connector assembly comprising:
  a longitudinal tensile element having an end portion and a cross-section thereof, wherein said longitudinal tensile element is at least a portion of a vehicle wheel spoke and wherein said spoke has a first end connected to a hub and a second end connected to an outer rim;
  an overmolded connecting element;
  an additional element, which is one of said rim and said hub that anchors said longitudinal tensile element;
  a tensile axis of applied tensile load along said longitudinal tensile element;
  wherein said overmolded connecting element surrounds the cross-section of said longitudinal tensile element, with an overlapping engagement therewith;
  wherein said overmolded connecting element is joined to said longitudinal tensile element by means of an overmolded connection;
  wherein said overmolded connecting element comprises hardened molding material with a conformable and softened state and a solidified and hardened state;
  wherein said longitudinal tensile element is integrally fixed to said hardened molding material;
  including a second tensile element joined to said longitudinal tensile element, wherein said overmolded connecting element serves as a coupling element to join said second tensile element to said longitudinal tensile element;
  wherein said overmolded connecting element contacts both said longitudinal tensile element and said second tensile element;
  including an overlap region, wherein said longitudinal tensile element overlaps said second tensile element along said tensile axis at said overlap region; and
  wherein said longitudinal tensile element includes a scoop-shaped geometry with a longitudinal opening and wherein said scoop-shaped geometry partially surrounds the cross section of said second tensile element to overlap said second tensile element in said overlap region.

* * * * *